(12) United States Patent
Jobe

(10) Patent No.: US 11,072,483 B2
(45) Date of Patent: Jul. 27, 2021

(54) THERMALLY INSULATING PACKAGING

(71) Applicant: Vericool, Inc., Livermore, CA (US)

(72) Inventor: Darrell Jobe, Livermore, CA (US)

(73) Assignee: Vericool, Inc., Livermore, CA (US)

( * ) Notice: Subject to any disclaimer, the term of this patent is extended or adjusted under 35 U.S.C. 154(b) by 0 days.

(21) Appl. No.: 16/825,526

(22) Filed: Mar. 20, 2020

(65) Prior Publication Data

US 2020/0283219 A1    Sep. 10, 2020

Related U.S. Application Data

(63) Continuation of application No. 15/904,168, filed on Feb. 23, 2018, now Pat. No. 10,597,219.

(60) Provisional application No. 62/467,705, filed on Mar. 6, 2017, provisional application No. 62/462,842, filed on Feb. 23, 2017.

(51) Int. Cl.
| | | |
|---|---|---|
| *B65D 81/38* | (2006.01) | |
| *B65B 55/20* | (2006.01) | |
| *B65D 65/46* | (2006.01) | |
| *B65D 81/09* | (2006.01) | |
| *B65D 21/02* | (2006.01) | |

(52) U.S. Cl.
CPC .......... *B65D 81/3816* (2013.01); *B65B 55/20* (2013.01); *B65D 21/0222* (2013.01); *B65D 65/466* (2013.01); *B65D 81/09* (2013.01); *B65D 81/382* (2013.01); *B65D 81/3818* (2013.01); *Y02W 90/10* (2015.05)

(58) Field of Classification Search
CPC .. B65D 81/3816; B65D 81/09; B65D 81/382; B65D 81/3818; B65D 21/0222; B65D 65/466; B65B 55/20
See application file for complete search history.

(56) References Cited

U.S. PATENT DOCUMENTS

| | | |
|---|---|---|
| 1,497,159 A | 6/1924 | Herbert |
| 1,641,030 A | 8/1927 | Moses |
| 1,691,178 A | 11/1928 | Beaman |
| 1,701,323 A | 2/1929 | Martin |
| 1,715,814 A | 6/1929 | Brown |

(Continued)

FOREIGN PATENT DOCUMENTS

| | | |
|---|---|---|
| CN | 2435329 | 6/2001 |
| CN | 101638162 | 2/2010 |

(Continued)

OTHER PUBLICATIONS

U.S. Appl. No. 15/089,344, filed Apr. 1, 2016, 25 pages.

*Primary Examiner* — Corey N Skurdal
(74) *Attorney, Agent, or Firm* — Fish & Richardson P.C.

(57) ABSTRACT

A thermally insulating packaging to hold an item includes a solid compostable or recyclable shell that is formed primarily of starch, and a bottom cover. The shell includes a floor, a plurality of inner side walls that are coupled to the floor, a rim coupled to the plurality of inner side walls, and a plurality of outer side walls that are couple to the rim. The floor and the plurality of inner side walls define an interior space of the shell to receive the item and an opening to the interior space. The plurality of inner side walls and plurality of outer side walls have a space therebetween that defines a gap. The gap can be an air-filled cavity, or be filled with a compostable or recyclable core material.

22 Claims, 22 Drawing Sheets

(56) References Cited

U.S. PATENT DOCUMENTS

| | | |
|---|---|---|
| 1,845,970 A | 2/1932 | Katz |
| 1,904,400 A | 4/1933 | Bangs et al. |
| 2,083,113 A | 6/1937 | Bergaud |
| 2,109,789 A | 3/1938 | Bangs et al. |
| 2,194,301 A | 3/1940 | Fourness et al. |
| 2,231,981 A | 2/1941 | Zalkind |
| 2,376,817 A | 8/1943 | Zalkind |
| 2,591,578 A | 4/1952 | McNealy |
| 2,808,976 A | 10/1957 | Merle |
| 2,828,903 A | 4/1958 | Adkins |
| 2,872,095 A | 2/1959 | Adams |
| 2,885,135 A | 5/1959 | Friday |
| 2,927,720 A | 3/1960 | Adams |
| 2,941,708 A | 6/1960 | Harold et al. |
| 3,166,191 A | 1/1965 | Chaplin |
| 3,196,021 A | 7/1965 | Oas et al. |
| 3,315,410 A | 4/1967 | French |
| 3,365,092 A | 1/1968 | Blessing |
| 3,416,692 A | 12/1968 | Delbert et al. |
| 3,513,531 A | 5/1970 | Humphress et al. |
| 3,539,075 A | 11/1970 | Bautista |
| 3,613,943 A * | 10/1971 | Bridenstine ......... B65D 21/045 206/507 |
| 3,678,703 A | 7/1972 | Cornish et al. |
| 3,746,204 A | 7/1973 | Nagai |
| 5,062,527 A | 11/1991 | Westerman |
| 5,180,060 A | 1/1993 | Forti et al. |
| 5,208,267 A | 5/1993 | Neumann et al. |
| 5,244,094 A | 9/1993 | Graff et al. |
| 5,266,763 A | 11/1993 | Colombo |
| 5,284,294 A | 2/1994 | Floyd |
| 5,307,986 A | 5/1994 | Schuster |
| 5,564,570 A | 10/1996 | Jaszai |
| 5,634,569 A | 6/1997 | De Coster |
| 5,758,513 A | 6/1998 | Smith |
| 5,827,385 A | 10/1998 | Meyer et al. |
| 5,896,641 A | 4/1999 | Yamada et al. |
| 5,897,017 A | 4/1999 | Lantz |
| 5,924,302 A | 7/1999 | Derifield |
| 6,168,040 B1 | 1/2001 | Sautner |
| 6,257,764 B1 | 7/2001 | Lantz |
| 6,325,281 B1 | 12/2001 | Grogan |
| 6,619,500 B1 | 9/2003 | Lantz |
| 6,740,373 B1 | 5/2004 | Swoboda et al. |
| 6,938,968 B2 | 9/2005 | Tanimoto et al. |
| 7,332,214 B2 | 2/2008 | Ozasa et al. |
| 8,557,367 B2 | 10/2013 | Netravali et al. |
| 8,617,684 B2 | 12/2013 | Nomura et al. |
| 8,763,811 B2 | 7/2014 | Lantz |
| 9,550,618 B1 | 1/2017 | Jobe |
| 9,856,608 B1 | 1/2018 | Chung et al. |
| 10,046,901 B1 | 8/2018 | Jobe |
| 10,059,495 B1 | 8/2018 | Korustan et al. |
| 10,625,925 B1 | 4/2020 | Jobe |
| 2002/0008113 A1 | 1/2002 | Fuji et al. |
| 2003/0082357 A1 | 5/2003 | Gokay et al. |
| 2003/0102317 A1 | 6/2003 | Gordon |
| 2003/0146224 A1 | 8/2003 | Fuji et al. |
| 2003/0152724 A1 | 8/2003 | Swoboda et al. |
| 2003/0217948 A1 | 11/2003 | Lantz |
| 2004/0058119 A1 | 3/2004 | Wynne |
| 2005/0202229 A1 | 9/2005 | Ozasa et al. |
| 2006/0065704 A1 | 3/2006 | Chang |
| 2006/0230778 A1 | 10/2006 | Williams |
| 2007/0051782 A1 | 3/2007 | Lantz |
| 2007/0158344 A1 | 7/2007 | Lin |
| 2008/0011621 A1 | 1/2008 | Liu et al. |
| 2008/0197037 A1 | 8/2008 | O'brien et al. |
| 2008/0289302 A1 | 11/2008 | Vulpitta |
| 2009/0001086 A1 | 1/2009 | Roderick et al. |
| 2009/0038978 A1 | 2/2009 | Lay |
| 2009/0265875 A1 | 10/2009 | Clamp et al. |
| 2010/0044267 A1* | 2/2010 | Tolibas-Spurlock ......................... B65D 65/466 206/524.7 |
| 2010/0258574 A1 | 10/2010 | Bentley |
| 2010/0314397 A1 | 12/2010 | Williams et al. |
| 2011/0042449 A1 | 2/2011 | Copenhaver et al. |
| 2011/0100868 A1 | 5/2011 | Lantz |
| 2011/0101077 A1 | 5/2011 | Lin |
| 2011/0248038 A1 | 10/2011 | Mayer |
| 2012/0097067 A1 | 4/2012 | Fascio |
| 2012/0279896 A1 | 11/2012 | Lantz |
| 2013/0112694 A1* | 5/2013 | Bentley ............... B65D 81/3823 220/592.2 |
| 2013/0112695 A1 | 5/2013 | Roskoss |
| 2013/0140317 A1 | 6/2013 | Roskoss |
| 2014/0021208 A1 | 1/2014 | Anti et al. |
| 2014/0093704 A1 | 4/2014 | Shi et al. |
| 2014/0144161 A1 | 5/2014 | Pointer et al. |
| 2014/0319018 A1 | 10/2014 | Collison |
| 2014/0353317 A1 | 12/2014 | Ranade et al. |
| 2015/0158656 A1 | 6/2015 | McKinnon |
| 2015/0336730 A1 | 11/2015 | Shields |
| 2015/0344211 A1 | 12/2015 | Moon |
| 2016/0023837 A1 | 1/2016 | Furneaux et al. |
| 2016/0052692 A1 | 2/2016 | Branham |
| 2016/0311604 A1 | 10/2016 | Qiu |
| 2017/0043937 A1 | 2/2017 | Lantz |
| 2017/0066582 A1 | 3/2017 | Vogel et al. |
| 2018/0029776 A1 | 2/2018 | Chung et al. |
| 2018/0215504 A1 | 8/2018 | Liu |
| 2018/0229911 A1 | 8/2018 | Luo |
| 2018/0229916 A1 | 8/2018 | Jobe |
| 2018/0229917 A1 | 8/2018 | Jobe |
| 2018/0237184 A1 | 8/2018 | Jobe |
| 2018/0237206 A1 | 8/2018 | Jobe |
| 2018/0305109 A1 | 10/2018 | Jobe |
| 2018/0334308 A1 | 11/2018 | Moore et al. |
| 2019/0367209 A1 | 12/2019 | Jobe |
| 2020/0102139 A1 | 4/2020 | Jobe |
| 2020/0122909 A1 | 4/2020 | Jobe |
| 2020/0140165 A1 | 5/2020 | Soto et al. |

FOREIGN PATENT DOCUMENTS

| | | |
|---|---|---|
| CN | 203473388 | 3/2014 |
| CN | 104743271 | 7/2015 |
| DE | 2461107 | 6/1976 |
| EP | 2000422 | 5/2012 |
| JP | H10-236545 | 9/1998 |
| JP | 2000-053180 | 2/2000 |
| JP | 2000-229676 | 8/2000 |
| JP | 2000-255640 | 9/2000 |
| KR | 20-0438192 | 1/2008 |
| KR | 20-0443141 | 1/2009 |
| WO | WO 2006/117801 | 11/2006 |
| WO | WO 2017/027189 | 2/2017 |

* cited by examiner

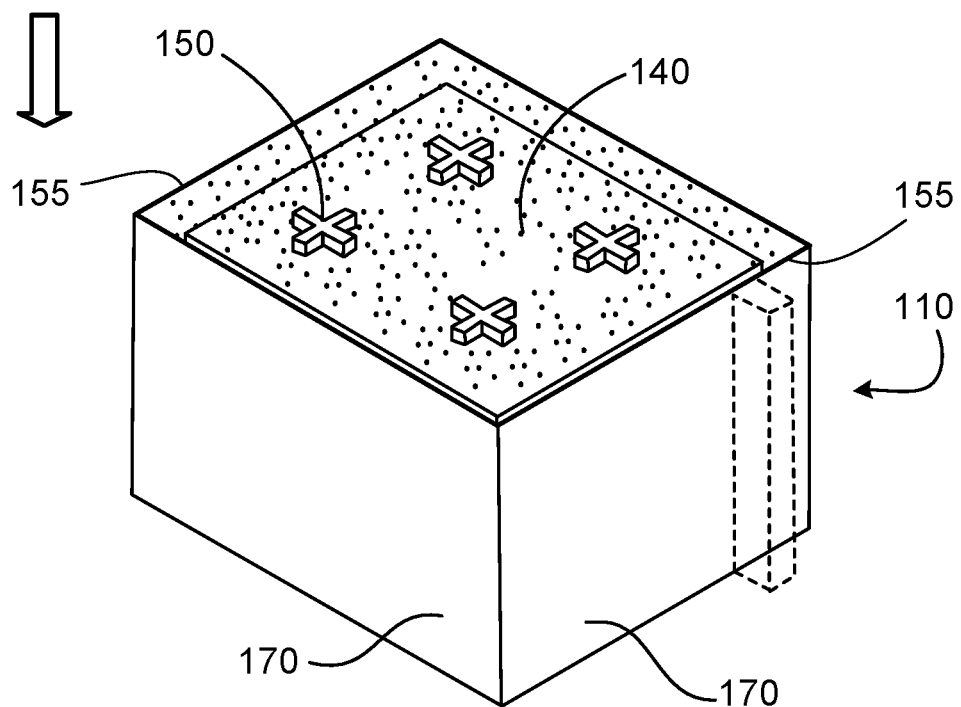
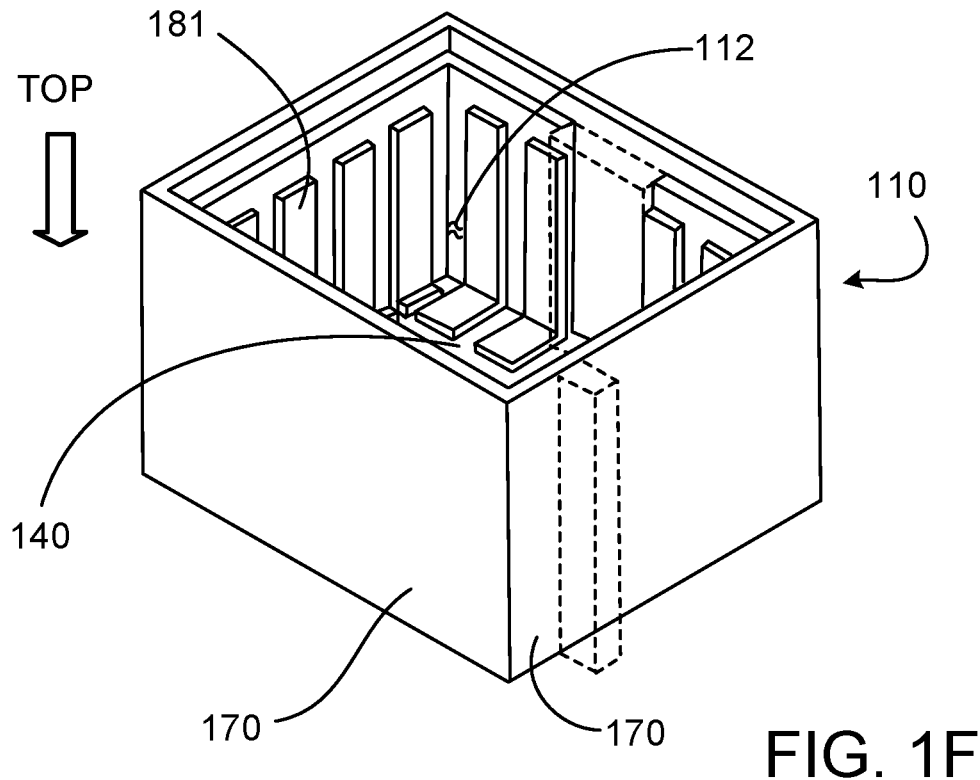
FIG. 1F

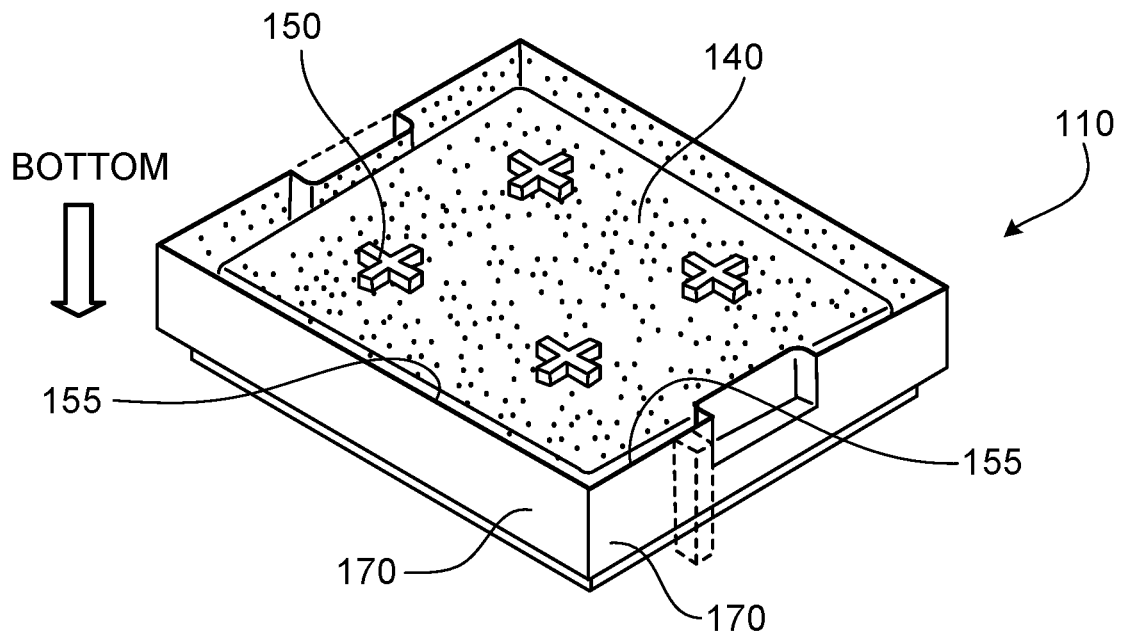
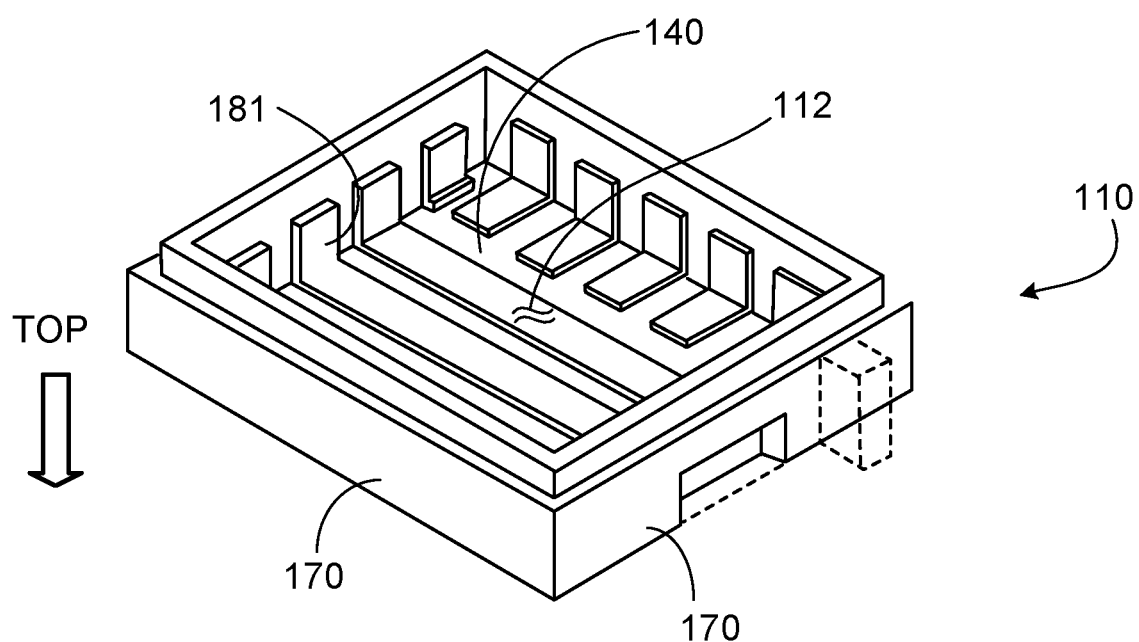
FIG. 1G

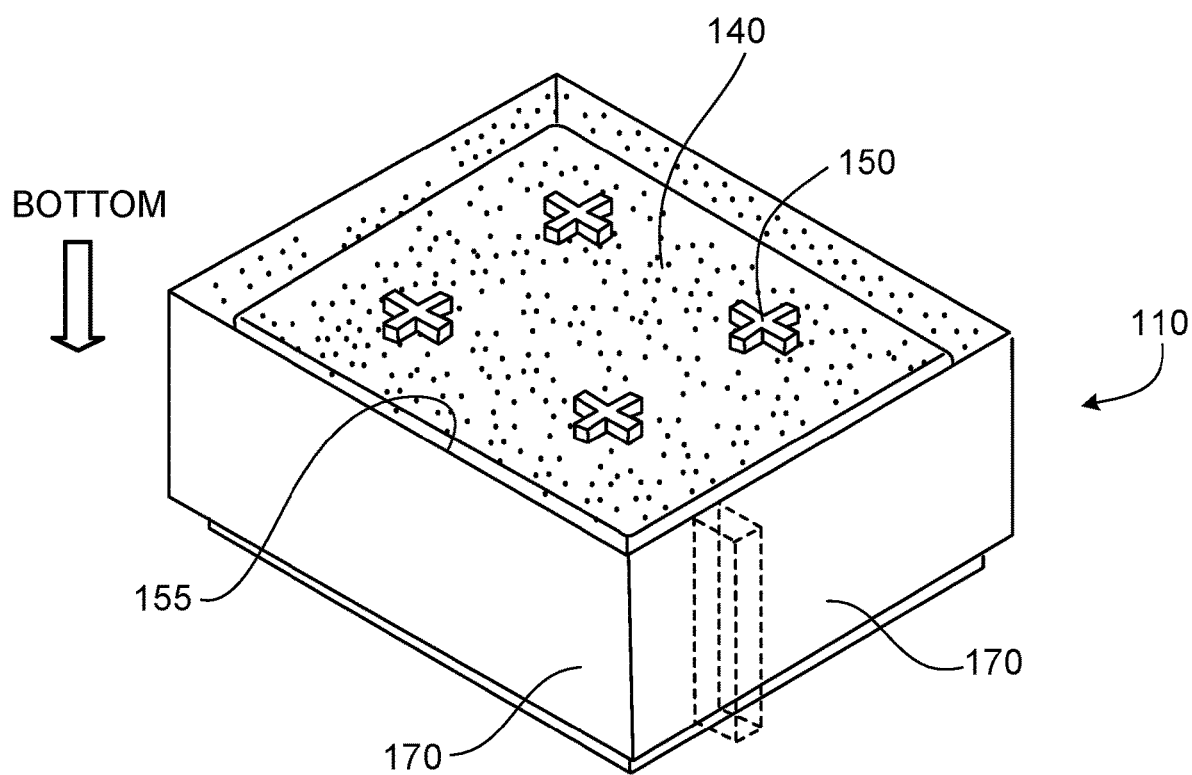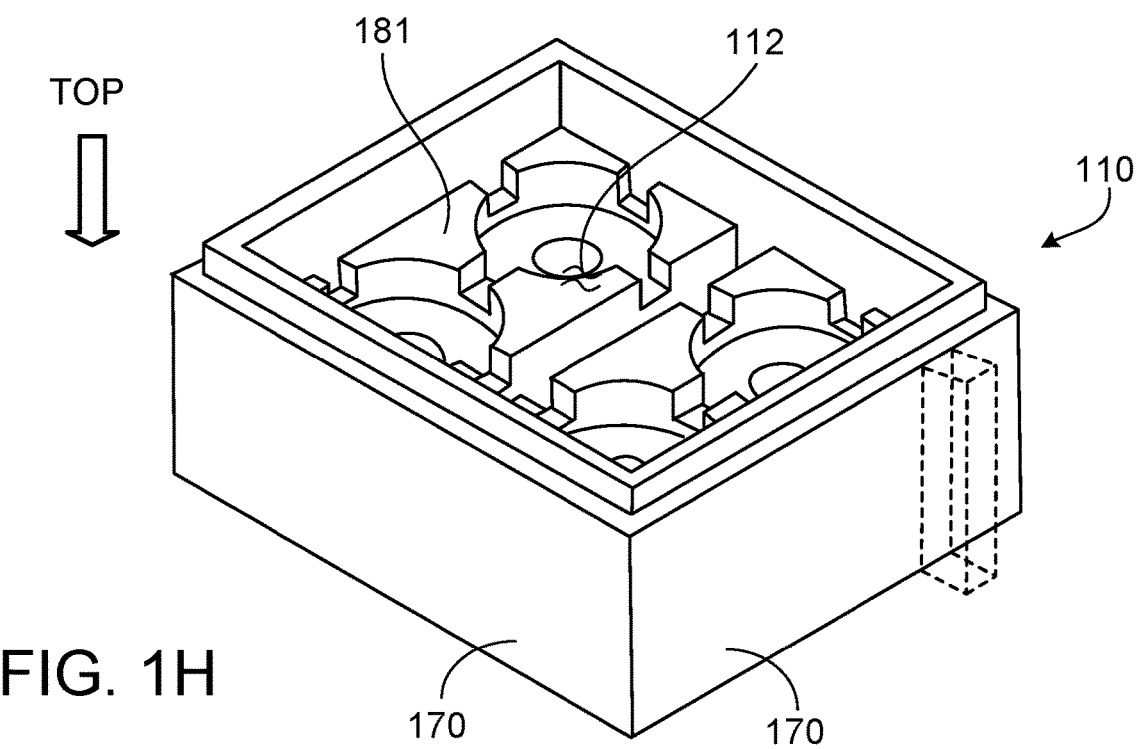
FIG. 1H

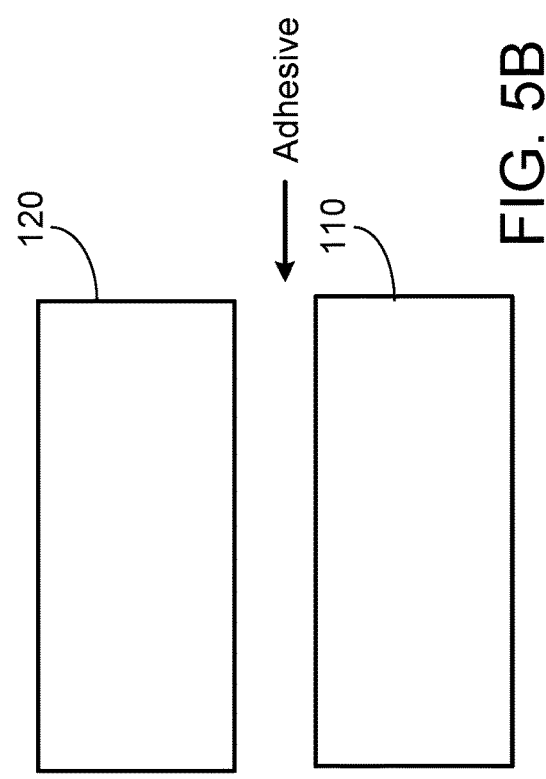
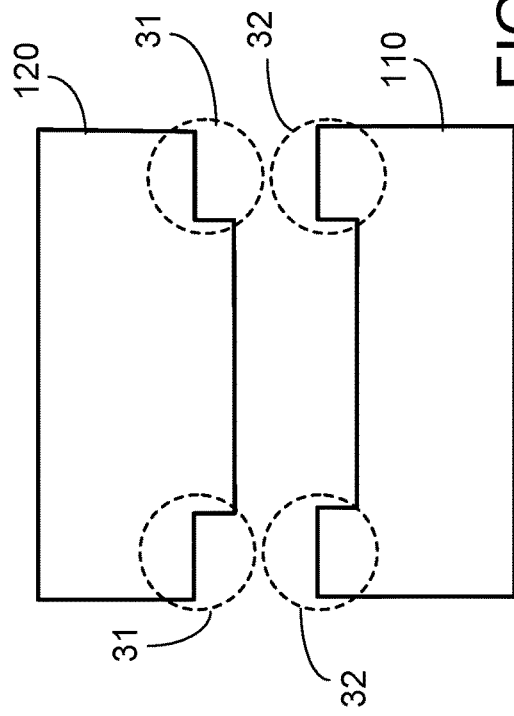
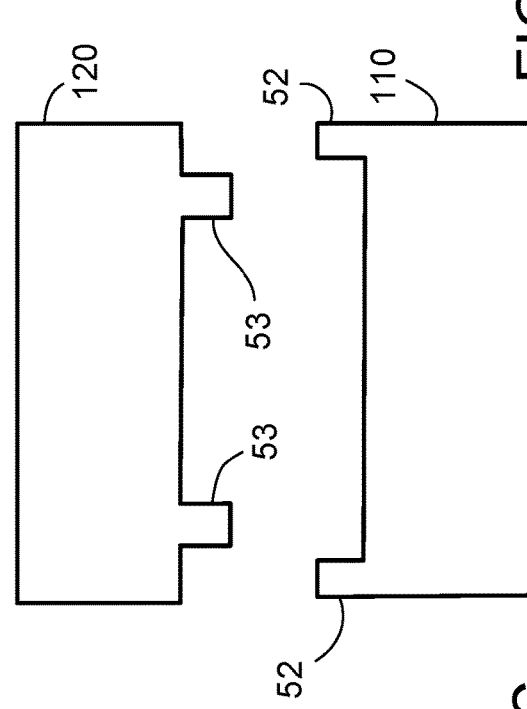
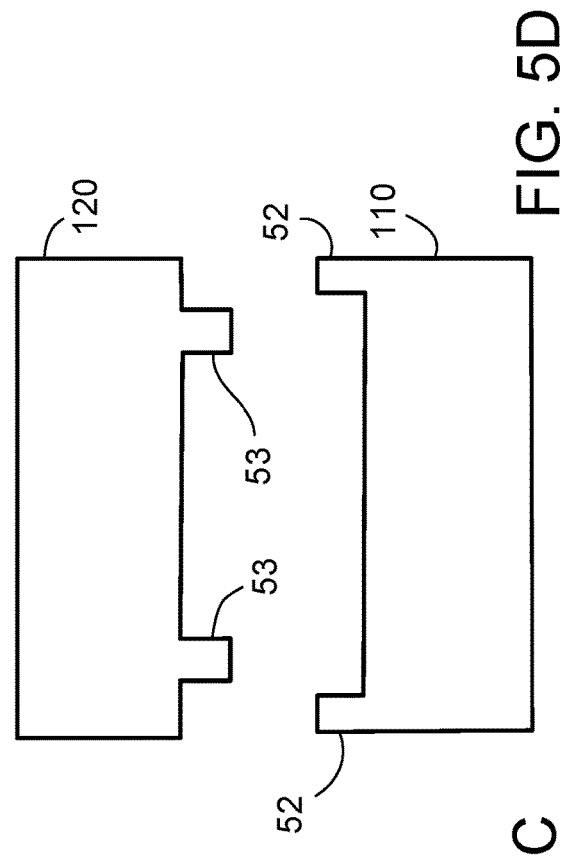

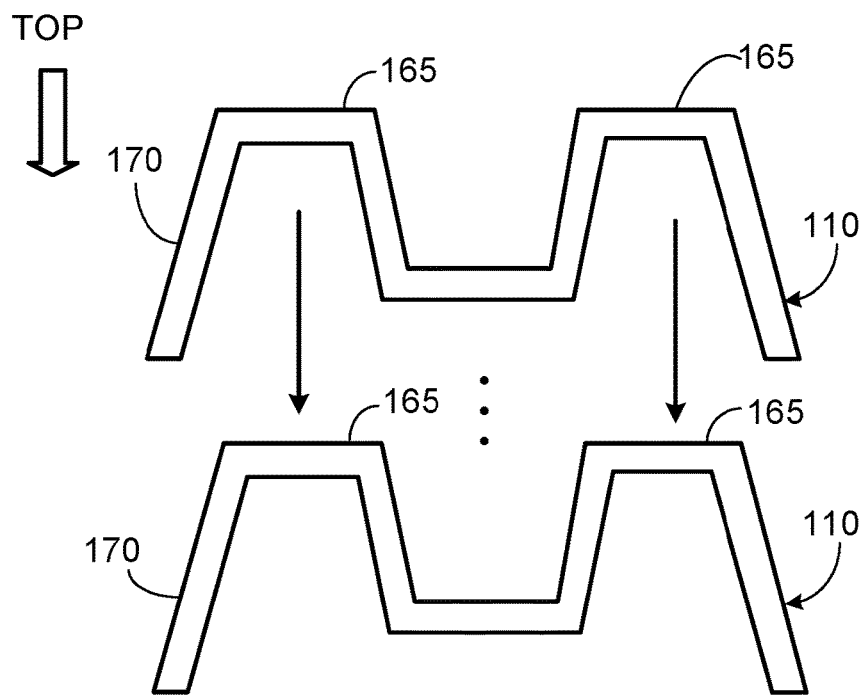
FIG. 7A
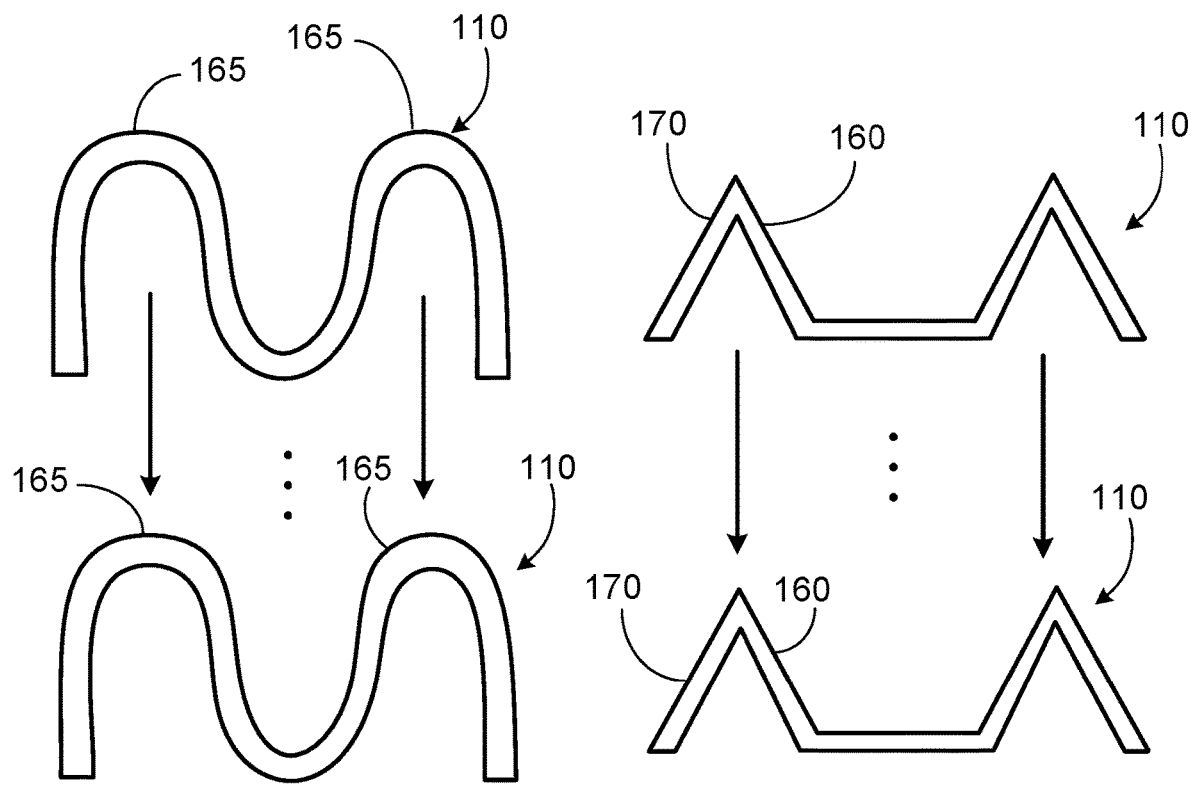
FIG. 7B
FIG. 7C

THERMALLY INSULATING PACKAGING

CROSS-REFERENCE TO RELATED APPLICATIONS

This application is a continuation of U.S. application Ser. No. 15/904,168, filed Feb. 23, 2018, which claims the benefit of U.S. Provisional Application Ser. No. 62/462,842, filed Feb. 23, 2017, and U.S. Provisional Application Ser. No. 62/467,705, filed Mar. 6, 2017, the disclosures of which are incorporated by reference.

TECHNICAL FIELD

This invention relates to a thermally insulating packaging.

BACKGROUND

A conventional container for shipping temperature sensitive products includes a cardboard box, inside of which is a thermally insulating material. A conventional thermally insulating material is expanded polystyrene (EPS), e.g., Styrofoam. For example, panels formed of expanded polystyrene can line the walls of the box, and another packing material, e.g., bubble wrap, can be placed surround and cushion the item being shipped inside the panels. Alternatively, expanded polystyrene can be machined or molded to form a "cooler" into which the item being shipped can be placed—this does not need an external box. In either case, a coolant, e.g., ice, dry ice or a gel pack, is placed in the cavity in the box with the item being shipped.

EPS is relatively inexpensive and easily formed into a variety of shapes, but is not compostable. Consequently, disposing of the material of the container can be a problem.

SUMMARY

Packaging is described that provides for thermal insulation of an item being shipped while the components of the packaging are still recyclable or compostable.

In general, in one aspect, a thermally insulating packaging to hold an item includes a solid compostable or recyclable shell that is formed primarily of a starch, and a bottom cover. The shell includes a floor, a plurality of inner side walls that are coupled to the floor, a rim coupled to the plurality of inner side walls, and a plurality of outer side walls that are coupled to the rim. The floor and the plurality of inner side walls define an interior space of the shell to receive the item and an opening to the interior space. The plurality of inner side walls and plurality of outer side walls have a space therebetween that defines a first gap. The floor is continuously coupled to each of the plurality of inner side walls, each of the plurality of inner side walls is continuously coupled to adjacent inner side walls, each of the plurality of inner side walls is continuously coupled to the rim, the rim is continuously coupled to each of the plurality of outer side walls, and each of the plurality of outer side walls is continuously coupled to adjacent outer side walls. The bottom cover is attached to bottom edges of the outer walls of the shell and extends below the floor of the shell. The floor and the bottom cover having a space therebetween that defines a second gap. The floor, the plurality of inner side walls, the rim, the plurality of outer side walls and the bottom cover define an air-filled cavity that includes the first gap and the second gap. The air-filled cavity and shell are sufficiently thick to provide thermal insulation.

The foregoing and other implementations can each optionally include one or more of the following features, alone or in combination.

The shell may be formed primarily a grain starch, a root starch, a vegetable starch, or combinations thereof. A first water-proof, water-resistant or water-repellant layer may be disposed on the shell and configured to block water penetrating the shell. The shell may include a first water-proof, water-resistant or water-repellant material mixed with the starch. The shell may consist of the material and the starch.

A thickness of the cavity may be between ¼ and 4 inches. A thickness of the shell may be between 0.02 and 0.3 inches.

The bottom cover may include a flap extending off a bottom edge of the outer side wall of the shell. The bottom cover may be a separate cover. The bottom cover may be secured to the shell with an adhesive to seal air in the cavity.

In another aspect, a thermally insulating packaging to hold an item includes a solid compostable or recyclable shell that is formed primarily of a first material that is a starch, and a compostable or recyclable core formed of a different second that is a starch, a plant fiber, a plastic, or a combination thereof. The shell includes a floor, a plurality of inner side walls that are coupled to the floor, a rim coupled to the plurality of inner side walls, and a plurality of outer side walls that are coupled to the rim. The floor and the plurality of inner side walls define an interior space of the shell to receive the item and an opening to the interior space. The plurality of inner side walls and plurality of outer side walls have a space therebetween that defines a gap. The floor is continuously coupled to each of the plurality of inner side walls, each of the plurality of inner side walls is continuously coupled to adjacent inner side walls, each of the plurality of inner side walls is continuously coupled to the rim, the rim is continuously coupled to each of the plurality of outer side walls, and each of the plurality of outer side walls is continuously coupled to adjacent outer side walls. The compostable or recyclable core is positioned in the first gap. The core and shell are sufficiently thick to provide thermal insulation.

The foregoing and other implementations can each optionally include one or more of the following features, alone or in combination.

A first water-proof, water-resistant or water-repellant layer may be disposed on the shell and may be configured to block water penetrating the shell. The shell may include a first water-proof, water-resistant or water-repellant material mixed with the plant fiber.

A thickness of the core may be between ¼ and 4 inches. A thickness of the shell may be between 0.02 and 0.3 inches The core may extend below the floor of the shell. A bottom cover may be attached to bottom edges of the outer walls of the shell and may extend below the floor of the shell.

The core may be a solid panel or loose-fill material. The core may be secured in the gap.

The shell may be formed primarily from a grain starch, a root starch, a vegetable starch, or combinations thereof. The second material may include a plant fiber, e.g., coconut husk, corn husk, linen, cotton, or combinations thereof.

The foregoing and other implementations can each optionally include one or more of the following features, alone or in combination.

The thermally insulating packaging may include a second solid compostable or recyclable body. The second solid compostable or recyclable body may include: a second floor, one or more second projections that are located on a surface of the second floor and that include one or more second grooves to hold a second portion of the item, a plurality of second inner side walls that are coupled to the second floor, a second rim that is coupled to the plurality of second inner side walls, and a plurality of second outer side walls that are coupled to the second rim. The second floor and the plurality of second inner side walls may define a second interior space. The second floor, the plurality of second inner side walls, the second rim, the plurality of second outer side walls may define a second space within the second solid compostable or recyclable body. The second floor may be continuously coupled to each of the plurality of second inner side walls, each of the plurality of second inner side walls may be continuously coupled to adjacent second inner side walls, each of the plurality of second inner side walls may be continuously coupled to the second rim, the second rim may be continuously coupled to each of the plurality of second outer side walls, and each of the plurality of second outer side walls may be continuously coupled to adjacent second outer side walls. The second solid compostable or recyclable body and the second space may be sufficiently thick to provide thermal insulation.

The plurality of first outer side walls may be coupled to the plurality of second outer side walls such that the first interior space of the first solid compostable or recyclable body is enclosed by the second solid compostable or recyclable body. The first solid compostable or recyclable body may further include first protrusions that are located on the first rim. The second solid compostable or recyclable body may include second grooves that are located on the second rims. The first protrusions may be inserted into the second grooves. The first solid compostable or recyclable body may further include first protrusions that are located on the first rim, the second solid compostable or recyclable body may include second protrusions that are located on the second rims, and the first protrusions may be coupled to the second protrusions.

The first solid compostable or recyclable body may further include one or more pads that are located on a surface of the first floor. The thermally insulating packaging may further include a cover that encloses the first cavity and that is primarily formed of a compostable or recyclable material.

At least one of the plurality of first outer side walls may include a groove on an outer surface of the first outer side wall that is configured to be gripped by a user to carry the thermally insulating packaging. The first solid compostable or recyclable body may further include a spacer that protrudes from a first outer side wall of the plurality of first outer side walls.

The item may be a bottle including a first end, a second end, and a bottle body that connects the first end to the second end. The one or more first grooves of the first solid compostable or recyclable body may have a circular shape such that each of the one or more first grooves is configured to hold the first end of the bottle. The one or more first grooves of the first solid compostable or recyclable body may have a bottle shape such that each of the one or more first grooves is configured to hold at least a portion of the bottle body of the bottle. The one or more first grooves of the first solid compostable or recyclable body may have a rectangular shape such that each of the one or more first grooves is configured to hold the item. At least one of the plurality of first outer side walls may include a groove on an inner surface of the first outer side wall that is configured to hold a cooler package.

The thermally insulating packaging may further include a water-proof, water-resistant, or water-repellant layer that, fully or in part, encloses the first solid compostable or recyclable body and that is configured to inhibit water from penetrating the layer. The water-proof, water-resistant, or water-repellant layer may be sprayed onto the first solid compostable or recyclable body. The first solid compostable or recyclable body may have a uniform thickness. The thickness of the first solid compostable or recyclable body may be between 0.5 and 5 inches. The compostable material may include a grain starch, a root starch, a vegetable starch, or combinations thereof. The compostable material may be a plant fiber. The plant fiber may be coconut husk, corn husk, linen, or cotton or paper, or combinations thereof. The first solid compostable or recyclable body may be stackable on top of the second solid compostable or recyclable body.

Potential advantages may include (and are not limited to) one or more of the following. The thermally insulating packaging is compostable or recyclable, so all of the components of the thermally insulating packaging are easily disposable. If present, the layer, in part or fully, enclosing the insulating material is compostable or recyclable, and also easily disposed. The thermally insulating packaging can store a cooling package to maintain the interior space of the thermally insulating packaging at a particular temperature so an item can be stored freshly. The thermally insulating packaging can provide equivalent thermal insulation to expanded polystyrene, and can be disposed in commercial and residential composting or recycling bins or garbage cans.

The details of one or more embodiments are set forth in the accompanying drawings and the description below. Other features, objects, and advantages of the invention will be apparent from the description and drawings, and from the claims.

DESCRIPTION OF DRAWINGS

FIGS. 1F to 1M are perspective views of implementations of a thermally insulating packaging.

FIGS. 5A to 5D are cross-sectional views of implementations of a cover for thermally insulating packaging.

FIGS. 7A to 7C are cross-sectional views of implementations of a stackable compostable or recyclable body.

Like reference symbols in the various drawings indicate like elements.

DETAILED DESCRIPTION

Initially, some terminology may be beneficial. "Biodegradable" simply means that a product will eventually disintegrate into to innocuous material. "Recyclable" indicates that a product can be reused or treated in order to be made suitable for reuse. "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most conventional thermally insulating materials for packaging, e.g., EPS, are not compostable. One technique for using a compostable insulating packaging material is to fill a volume between an inner wall and an outer wall of a box with loose-fill compostable cornstarch foam pellets (e.g., packing "peanuts") using layered stratification, and then compress each layer of foam pellets in within this volume to compact them. This technique requires either multiple boxes or a specialized box having both inner and outer walls, and also requires specialized machinery for layered stratification compaction of the pellets. The additional or specialized boxes increase the cost. In addition, the loose fill pellets are difficult to compost because they are messy when removed from the box. Moreover, a large amount of pressure, e.g., 25 lbs. or more, needs to be applied to close the top flaps of the box due to the resistance from the pellets.

However, instead of loose-fill foam pellets, a solid compostable or recyclable body formed primarily of a starch, e.g., milled extruded sorghum or corn starch, organic fibers, e.g., paper or corn husk fiber, or a plastic, e.g., polyethylene, provides a thermally insulating packaging for shipping an item, and this packaging can be used as the insulation in the container.

The solid compostable or recyclable body can be a single-piece body, or it can be a shell that surrounds a core of compostable or recyclable material, or it can be a shell that encloses an air-filled cavity.

The solid compostable or recyclable body can be enclosed by or coated with a biodegradable or recyclable layer. The layer can provide a moisture barrier. The layer can be a water-proof, water-resistant or water-repellant layer. In addition, a water-proof, water-resistant or water-repellant material can be mixed with the extruded starch or plant fiber to protect the body from moisture.

Structure of Thermally Insulating Packaging

Figure 1A:
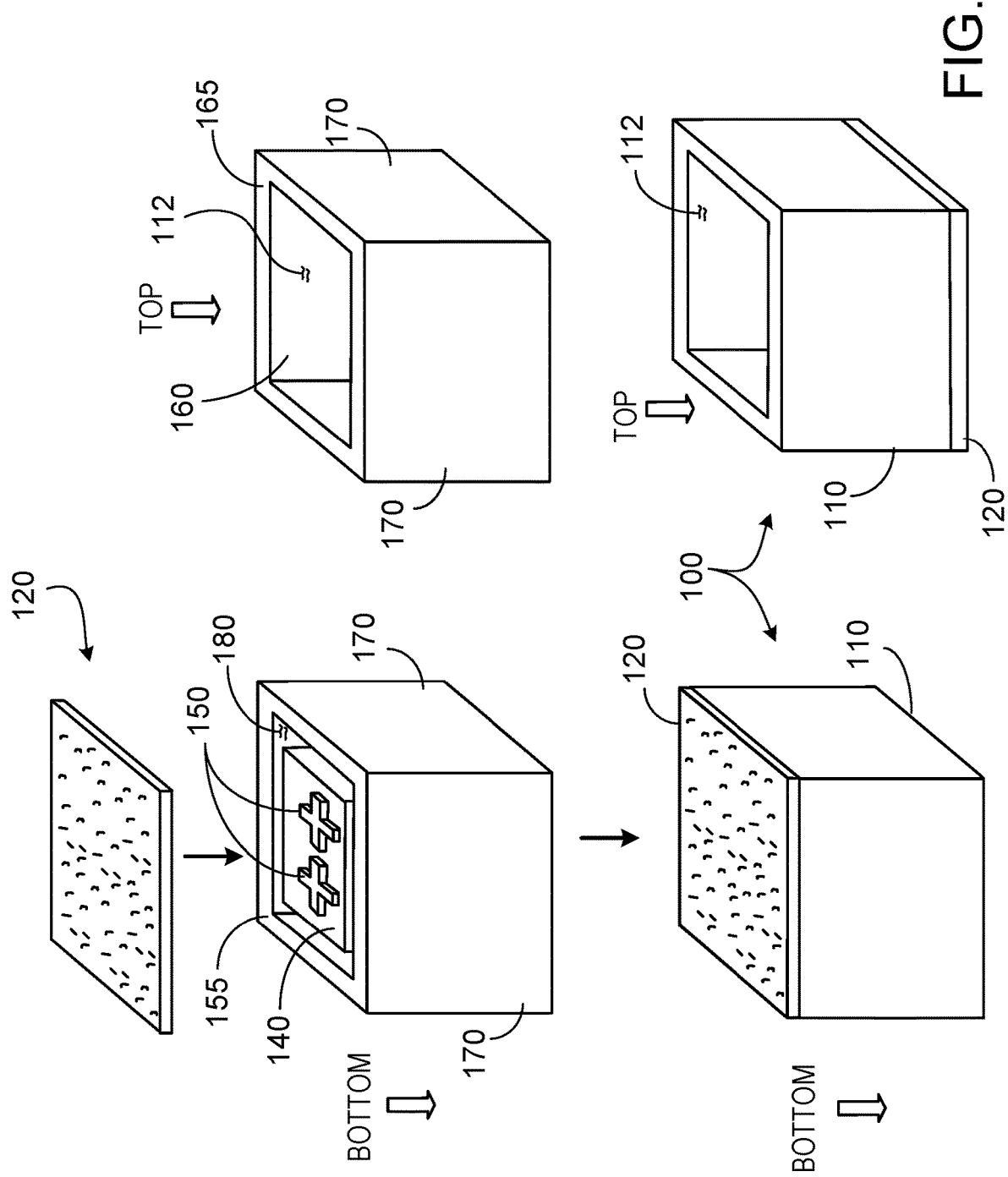
FIG. 1A is an exploded perspective view of a first implementation of a thermally insulating packaging.
Figure 1B:
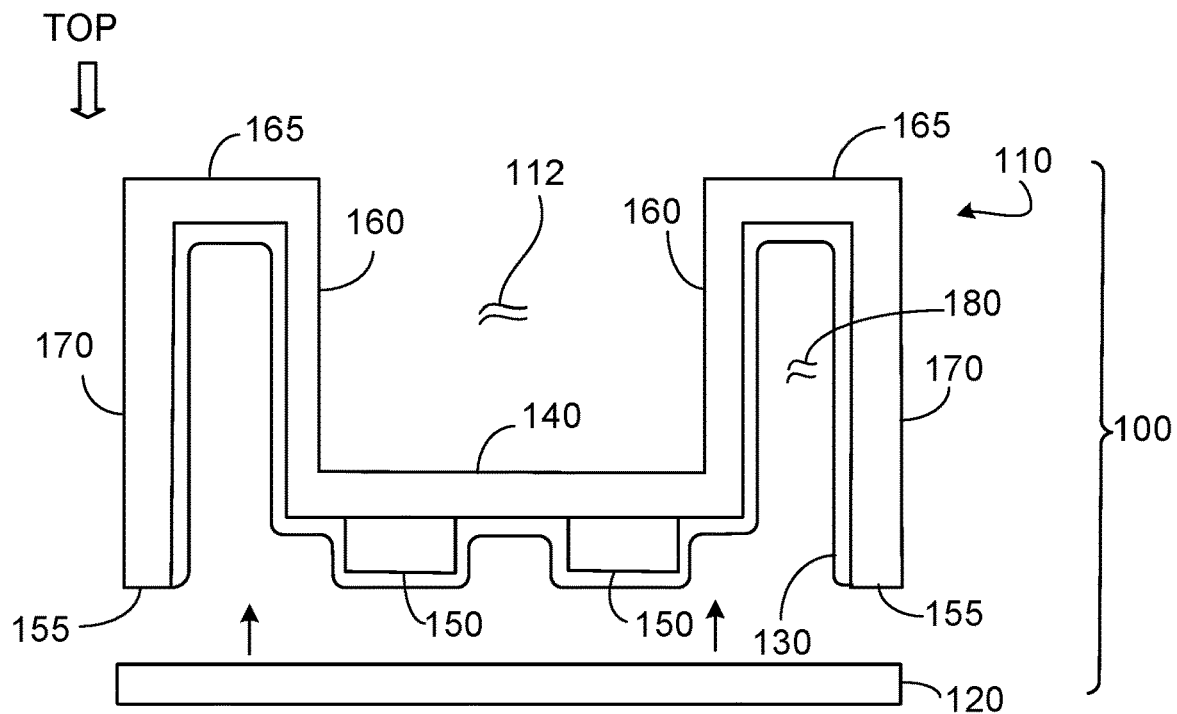
FIG. 1B is a cross-sectional view of the first implementation of a thermally insulating packaging.

FIG. 1A is an exploded perspective view of a first implementation of a thermally insulating packaging. FIG. 1B is a cross-sectional view of the first implementation of the thermally insulating packaging in FIG. 1A. In some implementations, the thermally insulating packaging 100 can be shipped without being inserted into a shipping box; in this case the packaging 100 can serve as the shipping container. In some other implementations, the thermally insulating packaging 100 can be inserted into a shipping box, e.g., a cardboard box, for shipping.

The thermally insulating packaging 100 includes a solid compostable or recyclable body 110 that is primarily formed of a compostable and/or recyclable material. In this context, "solid" indicates that the body 110 holds together as a single unit, e.g., rather than being formed of loose-fill pellets. The thermally insulating packaging 100 can optionally include a water-proof, water-resistant or water-repellant layer that covers at least a portion of the body 110.

Examples of the compostable material(s) for forming the body 110 are starch, organic fibers, or a combination of them. The starch can be a grain starch, e.g., a corn starch, a wheat starch or sorghum (sorghum is also known as milo), a root starch, e.g., a potato starch, or a vegetable starch. In some cases, a combinations of different starches can be used. The starch can be formed into the body 110 by an extrusion process.

The organic fiber can be a plant fiber, e.g., a wood fiber or a vegetable fiber. For example, the plant fibers could be fibers from coconut husk, corn husk, linen, or cotton. In some cases, a combination of plant fibers from different plants can be used. The organic fiber can be formed into the body 110 by mixing fibers into a pulp, e.g., a paper pulp or pulp of vegetable fibers, and then extruding the pulp or compressing the pulp in a mold. Where the body is formed from a paper pulp, the body can be considered to be formed of paper, e.g., a cardboard material.

An example of the recyclable material for forming the body 110 is a plastic, e.g., polyethylene. For example, the body 110 can include low-density polyethylene (LDPE), medium-density polyethylene (MDPE), high-density polyethylene (HDPE), or polyethylene terephthalate. In some implementations, polyethylene can be shredded into particles having a particular size or a random size and be compacted to form the body 110. An advantage of polyethylene is ease of fabrication and good water resistance.

Another example of recyclable material for the body 110 is organic fiber, e.g., plant fiber, such as paper (whether paper is compostable or recyclable can depend on the thickness, size and porosity of the body). As noted above, the organic fiber can be formed into the body 110 by mixing fibers into a pulp, e.g., paper pulp or pulp of vegetable fibers, and then extruding the pulp or compressing the pulp in a mold.

In some implementations, the body 110 consists of starch. In some implementations, the body consists of plant fiber. In some cases, a combination of starch and plant fiber can be used; the body can consist of starch and plant fiber.

In some implementations, a moisture barrier material to increase resistance of the body 110 to water can be mixed with the starch and/or organic fiber. The material can be mixed with the starch or fiber while it is liquid form, e.g., with the fiber pulp, and then harden in the body. Whether the resulting material of the body 110 is water-proof, water-resistant or water-repellant can depend on the concentration of the material. In some implementations the material can be polylactic acid (PLA). In some implementations, the body 110 consists of starch and/or plant fiber, in combination with the moisture barrier material.

Other materials that do not interfere with the compostable or recyclable nature of the body 110, e.g., a softener to improve adhesion of the starch, or a preservative or antifungal agent, can be present, but only in small quantities. For example, at least 85%, e.g., at least 90-95%, by weight of the body 110 is starch and/or pulp. Polyvinyl alcohol can be present, e.g., 5-10% by weight.

In some implementations, the body 110 is entirely compostable, i.e., consists of compostable materials. In some implementations, the body 110 is entirely recyclable, i.e., consists of recyclable materials. In some implementations, the body 110 is formed of a combination of compostable and recyclable materials.

In some implementations, the material of the body 110 can be a foam material, e.g., to include small pores or voids spread substantially uniformly through the body 110. For example, 10-80% of the volume of the body 111 can be pores or voids, e.g., 25-75%, 25-50%, 10-25%, 50-75%. The maximum size of the pores or voids can be about 1 mm. Although the body 110 could be a foam material, it is generally incompressible. The density of the solid compostable or recyclable body 110 can be about 0.4-3.5 g/cm$^3$, e.g., 0.6-1.0 g/cm$^3$, 0.8-2.0 g/cm$^3$, 1.0-3.5 g/cm$^3$.

The thickness of the body 110 can be about 0.5-5 inches, e.g., 1-3 inches. Any given unitary body 110 can have substantially uniform thickness. The floor 140, the outer side walls 160, and the inner side walls 170 can have substantially uniform thickness. In some implementations, the surfaces of the body 110 can be generally flat. In some other implementations, one or more surfaces of the body 110 can be corrugated. Corrugation can increase the effective thickness of the body 110, e.g., by a factor of up to 4. In this case, the thickness of the body 110 can still be uniform, but the body 110 is shaped with corrugations. However, in some implementations, the inner surfaces of the body have various projections, e.g., tabs or struts, e.g., to assist in positioning of the item to be shipped or for increased structural support. In some implementations, the inner surfaces of the body have various projections, e.g., tabs or struts, e.g., to assist in positioning of the item to be shipped or for increased structural support. In addition, in some implementations, the outer surfaces of the body can have various projections, e.g., pads or struts, e.g., to assist provide increased structural support or cushioning.

Referring a top view of the thermally insulating packaging 100 shown in FIG. 1A, the thermally insulating packaging 100 generally takes the form of a "tub," e.g., a container with floor and side-walls and that is open at the top and has an interior space 112. The "tub" can have box-like shape, e.g., a generally rectilinear prism. Of course, the edges of the body can be rounded, while remaining a generally rectilinear prism. In addition, the "tub" could have other shapes, e.g., octagonal, cylindrical, etc., while still considered to have side-walls.

In some implementations, the interior space 112 can have a square shape. In some other implementations, the interior area 112 can have a rectangular shape. In some other implementations, the interior area 112 can have a circular shape.

Figure 1C:
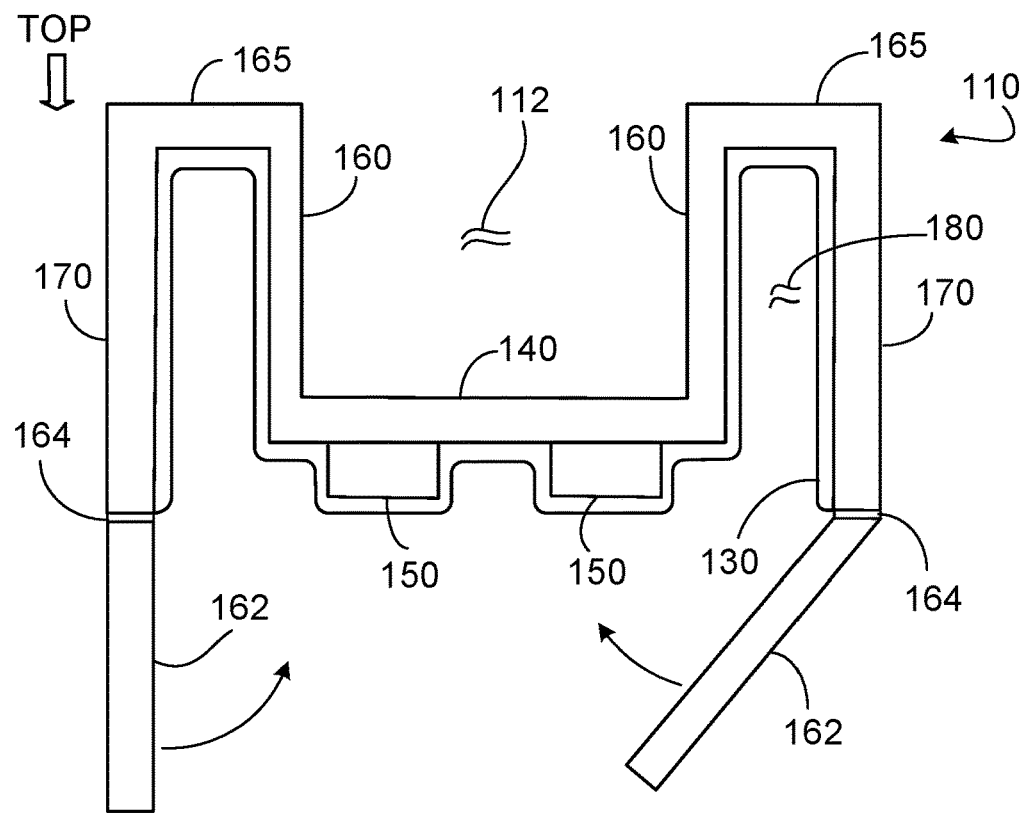
FIG. 1C is a cross-sectional view of a second implementation of a thermally insulating packaging.
Figure 1D:
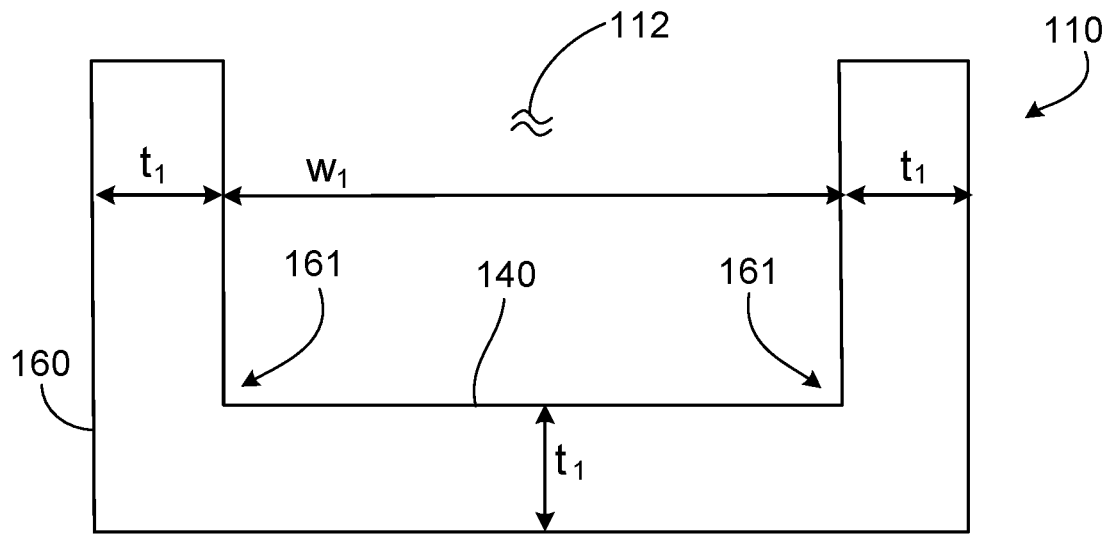
FIG. 1D is a cross-sectional view of a third implementation of a thermally insulating packaging.
Figure 1E:
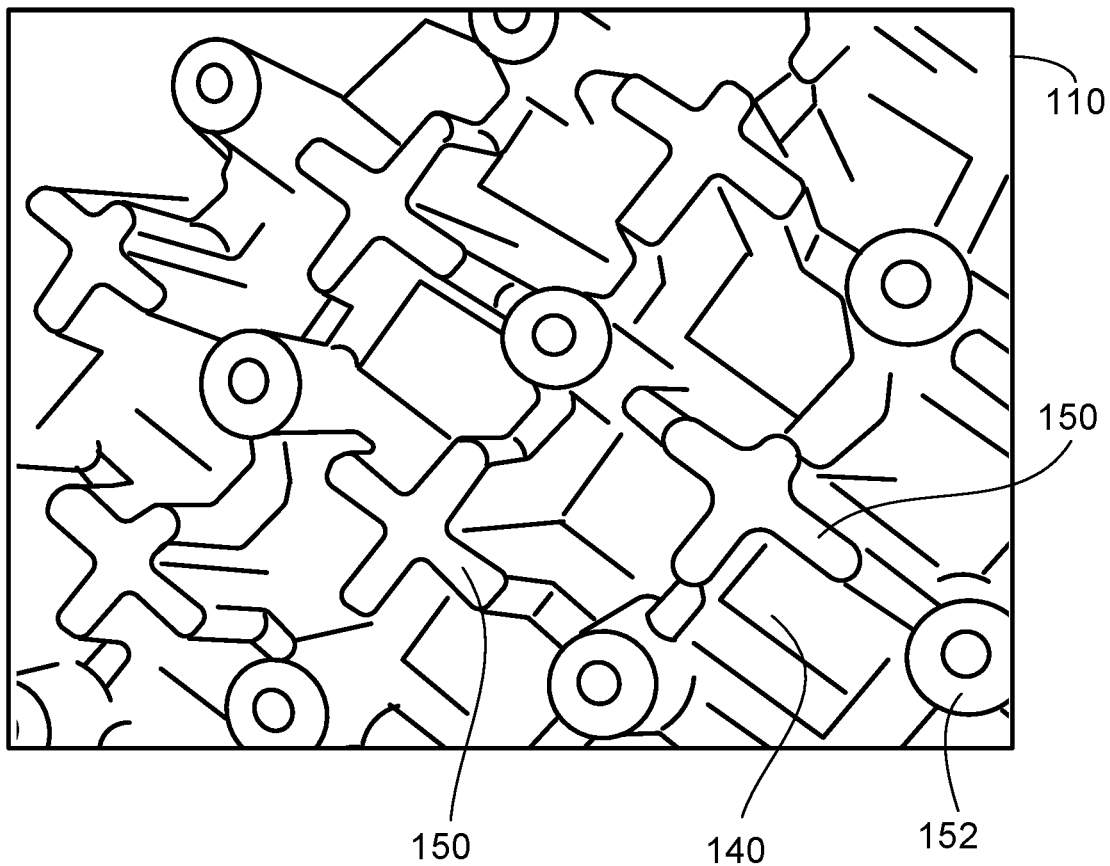
FIG. 1E is a bottom view of a floor of a fourth implementation of a thermally insulating packaging.
Figure 1I:
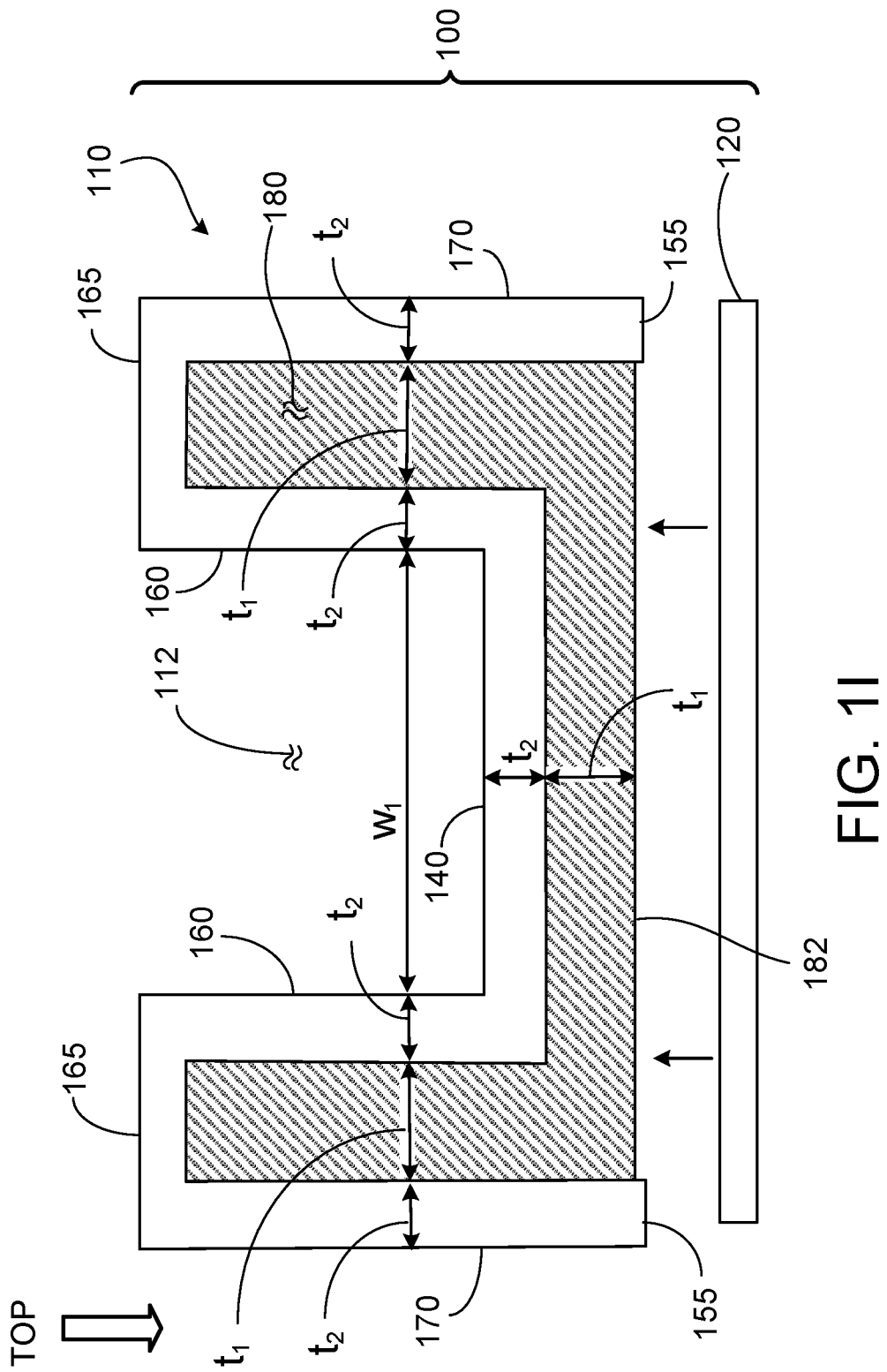

Referring FIGS. 1B, 1D and 1I, the body 110 is or includes a unitary layer that provides at least a floor 140 and side walls 160 for the interior space 112 of the body 110. This unitary layer is "continuous." In this context, "continuous" indicates that the portions are joined without a discontinuity in material composition; there is no gap, adhesive, melted region, or similar disruption in the material composition to indicate a seam between floor and walls or between adjacent walls. This unitary layer holds together by itself as a single unit without adhesives or fasteners to join multiple sections.

The solid compostable or recyclable body 110 can have a uniform homogenous composition. The solid compostable or recyclable body 110 can be primarily formed of a single compostable or recyclable material.

As shown in FIGS. 1B and 1D, the packaging 100 can be a single-piece body, i.e., the solid compostable or recyclable body 110 consists of, i.e., is only, the unitary layer. As a unitary layer, the floor 140 of the solid compostable or recyclable body 110 is joined "continuously" to the side walls 160 along edges 161. In addition, each of the side walls 160 is joined "continuously" to its adjacent side walls along edges, e.g., an edge 161.

As shown in FIGS. 1B and 1I, the unitary layer of the body can form a shell with a gap between inner side walls 160 that provide the side walls of the interior space 112 and outer side walls 170 that provide the side walls of the exterior of the packaging. Together, the inner side wall and outer side walls can provide the side walls of the packaging.

Alternatively, as shown in FIG. 1D, the body doesn't include any interior cavity between the inside surface and outside surface of the side walls of the packaging. In this case, the side walls 160 can provide both the inside surface (that provides the interior space) and the outside surface of the packaging. The body 110 can be of continuous between the inside surface and outside surface of the side walls 160. The body 110 can be of homogenous composition between the inside surface and outside surface of the side walls.

For any of the various implementations, although the floor and walls of the body 110 can be thin, as compared to their respective length and width, the floor and walls are thick enough to provide sufficient thermal insulating function for common commercial applications that require shipment by package delivery service, e.g., FedEx or UPS services, of packages, e.g., up to 48"×48"×48", of products, e.g., foods or medical supplies, that need to be kept cool, e.g., at temperatures of 32-48° F. In general, this can be accomplished with the body 110 having a thicknesses noted above, e.g., of about 0.5-5 inches for a single-piece compostable body. For a body including a shell, the thickness can be 0.25-4 inches for the core or air gap, and 0.01 to 0.75 inch (0.25-18 mm), e.g. 0.02 to 0.3 inches (0.5-7.5 mm), e.g., 0.02 to 0.1 inches (0.5-2.5 mm) for the shell. In some implementations, the shell is between $\frac{1}{32}$ and 1 inch thick.

An example thickness t1 of the solid compostable or recyclable body 110 can be 0.5-5 inches. In some implementations, e.g., the illustrated example of FIG. 1D, the solid compostable or recyclable body 110 has substantially uniform thickness. In some implementations, the solid compostable or recyclable body 110 can have non-uniform thickness. For example, a thickness of the floor 140 can be different from a thickness for the side wall 160. A width w1 of the interior space 112 can be 3-48 inches.

In the example of the body 110 in FIGS. 1A, 1B and 1I, the floor 140 is continuously joined to the inner side walls 160. Each of the inner side walls 160 is joined "continuously" to its adjacent inner side walls along edges. The inner side walls 160 are also continuously jointed to the outer side walls 170 by a rim 165 of the body 110. Each of the outer side walls 170 is joined "continuously" to its adjacent outer side walls along edges.

In the example of the body 110 in FIGS. 1B and 1I, the floor 140, the inner side walls 160, the rims 165, the outer side walls 170 define a cavity 180 within the body 110. The gap between the inner side wall 160 and the outer side wall 170 can be 0.5-4 inches.

In some implementations, e.g., referring to FIG. 1B, the cavity 180 can be left as an empty space, e.g., an air gap. The bottom of the thermally insulating packaging 100 is closed off by a lower cover 120 to enclose the space.

In some implementations, e.g., referring to FIG. 1I, a compostable or recyclable material(s) is placed in the cavity 180. In this case, the body 110 includes both a shell (formed from the body described above) and material that fits into the cavity 180 in the shell and that provides a core 182 of the body. The cavity 180 can be filled with the compostable or recyclable material(s). Optionally, the bottom of the thermally insulating packaging 100 is closed off by a lower cover 120 to cover the core 182 of the body 110.

An example thickness t1 of the core 182 can be 0.25-4 inches. An example thickness t2 of the outer side walls 160, the rims 165, and the inner sidewalls 170 can be 0.125-0.5 inches.

In some illustrated examples, e.g., FIG. 1I, the body 110 has substantially uniform thickness. The inner side walls 160, rims 165, and outer side walls 170 have a uniform thickness. In some implementations, the body 110 can have non-uniform thickness. For example, thicknesses of the inner side walls 160, rims 165, and outer side walls 170 can be different from each other. A width w1 of the interior space 112 can be 3-48 inches. In addition, as described below, the interior and/or exterior surfaces of the body 110 can have protrusions and/or recesses.

In some implementations, the shell and the core can have different compositions. For example, the shell can be primarily formed of starch, e.g., corn starch, whereas the core can be primarily formed of organic fiber, e.g., paper. As another example, the shell can be primarily formed of organic fiber, e.g., paper, whereas the core is primarily formed of starch, e.g., corn starch.

As another example, the shell can be primarily formed of a first kind of starch, e.g., a grain starch, such as corn starch, while the core can be primarily formed of a second kind of starch, e.g., a root starch or vegetable starch, or another grain starch, such as sorghum. As another example, the shell can be primarily formed of a first kind of plant fiber, e.g., paper, while the core can be primarily formed of a second kind of plant fiber, e.g., a vegetable fiber, such as corn husk fiber. In these examples, both the shell and the core are compostable and recyclable.

As another example, the shell can be primarily formed of starch or plant fiber, and the core can be primarily formed of a recyclable plastic, e.g., polyethylene. For example, the plastic can be in a shredded or pellet form, e.g., shredded polyethylene or polyethylene pellets. In this example, the shell is compostable and recyclable while the core is recyclable. As another example, the core can be primarily formed of starch or plant fiber, and the shell can be primarily formed of polyethylene. In this example, the core is compostable and recyclable while the shell is recyclable. In these implementations, even if the shell has a composition that is different from a composition of the core, each of the shell and the core can have a uniform homogenous composition.

In some implementations, the shell and the core can have the same composition, but the composition of the shell and the composition of the core can be differently processed. For example, both the shell and the core can be primarily formed of a starch. However, the starch used for the shell can be processed at a first temperature during a drying process while the starch used for the core can be processed at a second temperature during a drying process.

In some implementations, the shell and the core can have different firmness. For example, the shell can be primarily formed of a material that is harder than the material that provides the core, or vice versa. Alternatively, the shell and the core can have the same firmness.

In some implementations, e.g., as shown in FIG. 1F, the shell is a solid body but the core is loose material, e.g., pellets, shredded material, powder, etc. For example, the core can be composed of starch pellets, shredded paper, loose plant fibers, etc.

In some implementations, both the shell and the core are solid bodies, but the core is slidable within the cavity 180 between the inside side wall 160 and the outside side wall 170. For example, the core can be provided by one or more solid panels that fit into the cavities. Such solid panels can be formed by an extrusion process, e.g., extrusion of a starch, or by a compaction process, e.g., compaction of a plant fiber pulp. In some implementations, there is a separate panel for each side of the body 110, with each panel independently slidable within the cavity 180. Optionally another panel may be positioned below the floor 140. Thus, there can be four (or five) panels for the rectilinear tub shape of the packaging 100. In some implementations, the core can include a multi-part panel, e.g., a panel that is folded into an appropriate shape and then inserted into the cavity 180. For example, the core can be provided by a single a multi-part panel, e.g., a strip that is folded into a collar and inserted into the cavity 180, or a cross-shape that is folded and inserted into the cavity such that each arm of the cross fits into one side wall and the center of the cross is positioned below the floor 140.

In some implementations, the core is effectively fixed inside the shell. For example, the core can include a solid body that is friction fit or secured with adhesive to the interior surfaces of the shell. As another example, loose material, e.g., pellets, shredded material, or powder, can be compacted within the cavity 180 to an extent that the loose material is wedged inside the shell.

If the core is loose or slidable within the cavity 180, the bottom of the shell will need to be covered, e.g., by the lower cover 120, to retain the loose material of the core within the shell. The cover 120 can partially compact the loose material within the cavity 180. However, the compaction need not be to an extent that the loose material is wedged inside the shell.

If the core is a solid body or is a loose material that is sufficiently compacted that it can't be trivially dislodged, then covering the bottom of the shell is optional; a portion of the shell can extend across the bottom of the core to enclose the core, or the bottom of the core could provide the lower outer surface of the body 110.

In some other implementations, e.g., as shown in FIG. 1B, the cavity 180 can be filled with air, that is the cavity 180 can be left as an empty space. In this case, the bottom of the shell can be covered to enclose the air within the cavity 180. For example, as shown in FIGS. 1B, 1I, 1J, and 1L, a separate cover 120 can be secured to the bottom edges of the outer walls of the shell. As another example, as shown in FIGS. 1C, 1K and 1M, the shell can includes one or more flaps 162 that are folded inward to enclose the cavity 180. The bottom cover, either as a separate cover 120 or flaps 162, can be attached to the shell with adhesive to seal the air within the cavity.

In some implementations, support pieces can be placed between the floor 140 of the shell and the cover 120 or flaps 162 to prevent collapse of the floor 140 when weight is placed in the interior 112.

The inner side walls 170 can have a height (in the vertical direction) smaller, e.g., by about 0.5 to 4 inches, than the height of the outer side walls 160. This permits a gap to be formed between the lower cover 120 and the floor 140 when the lower cover 120 is attached to the body 110. Alternatively, the bottom of the floor 140 could be coplanar with the bottom of the outer side walls 160; in this case there would not be a gap below the floor 140 when the lower cover 120 is attached.

Referring to FIGS. 1A and 1B, the body 110 includes a floor 140, inner side walls 160, and outer side walls 170. The inner side walls 160 and the inner side walls 170 are joined at rims 165 of the body 110. The floor 140 and the inner side walls 160 of the body 110 define the interior space 112 of the body 110 to receive the item and optionally a coolant, e.g., ice, dry ice or a gel pack.

As noted above, the body 110 (whether a single-piece body or a shell that encloses air or a core material) can include one or more projections that project inwardly from the floor or side walls of the body 110. The inward projections can serve to hold the item in the interior space 112, to divide the interior space 112 into separate sub-compartments, or to provide increased structural support for the body 110.

Figure 1J:
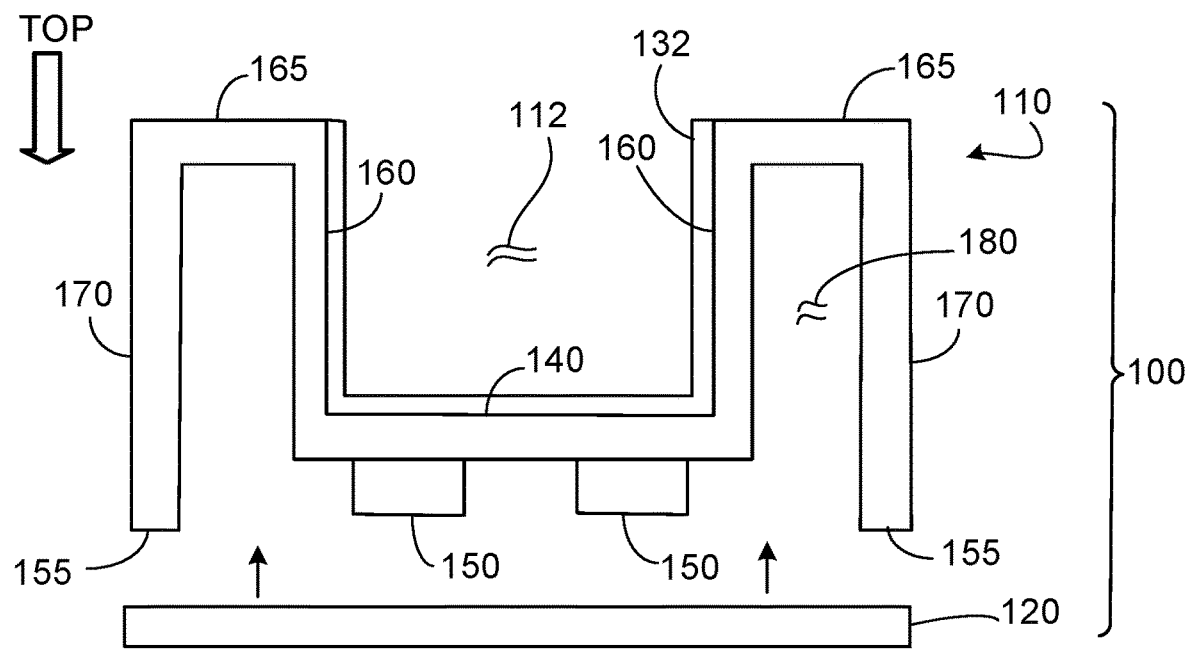
Figure 1K:
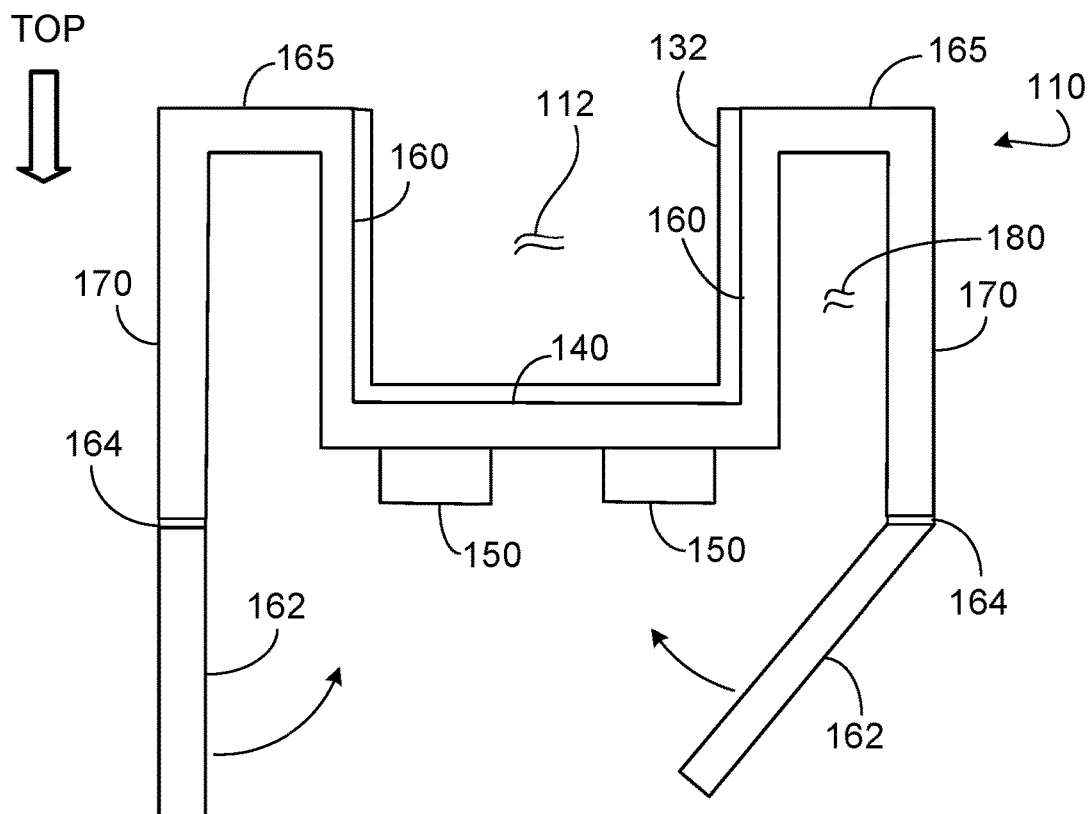
Figure 1L:
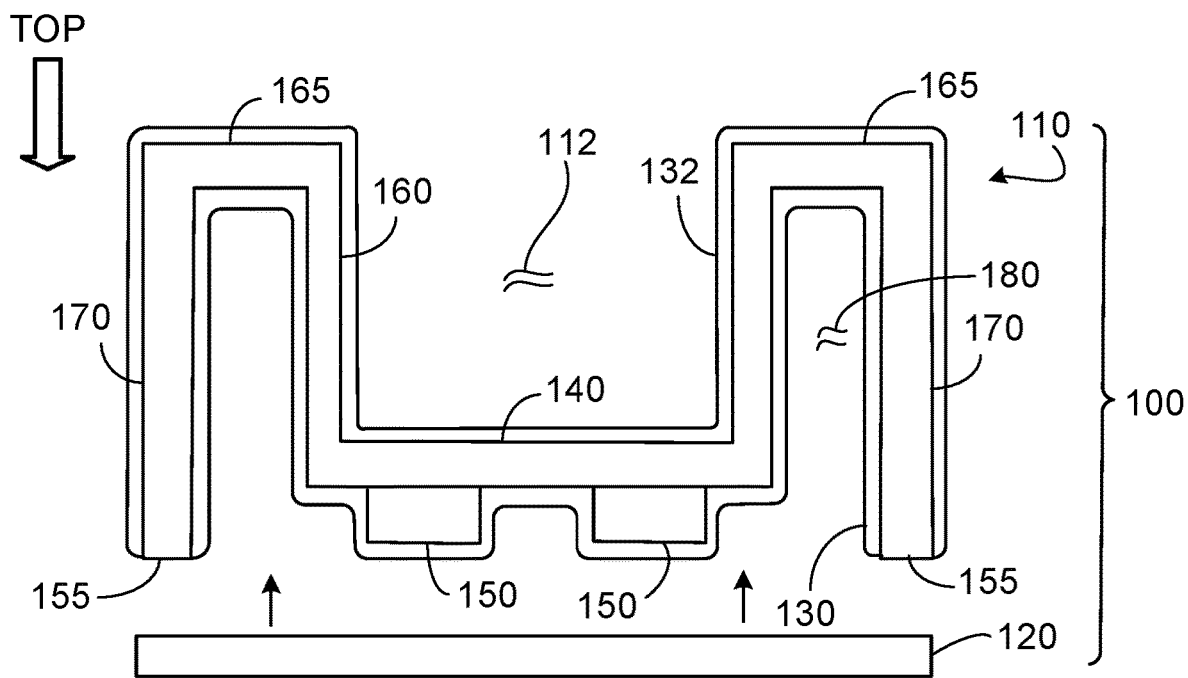
Figure 1M:
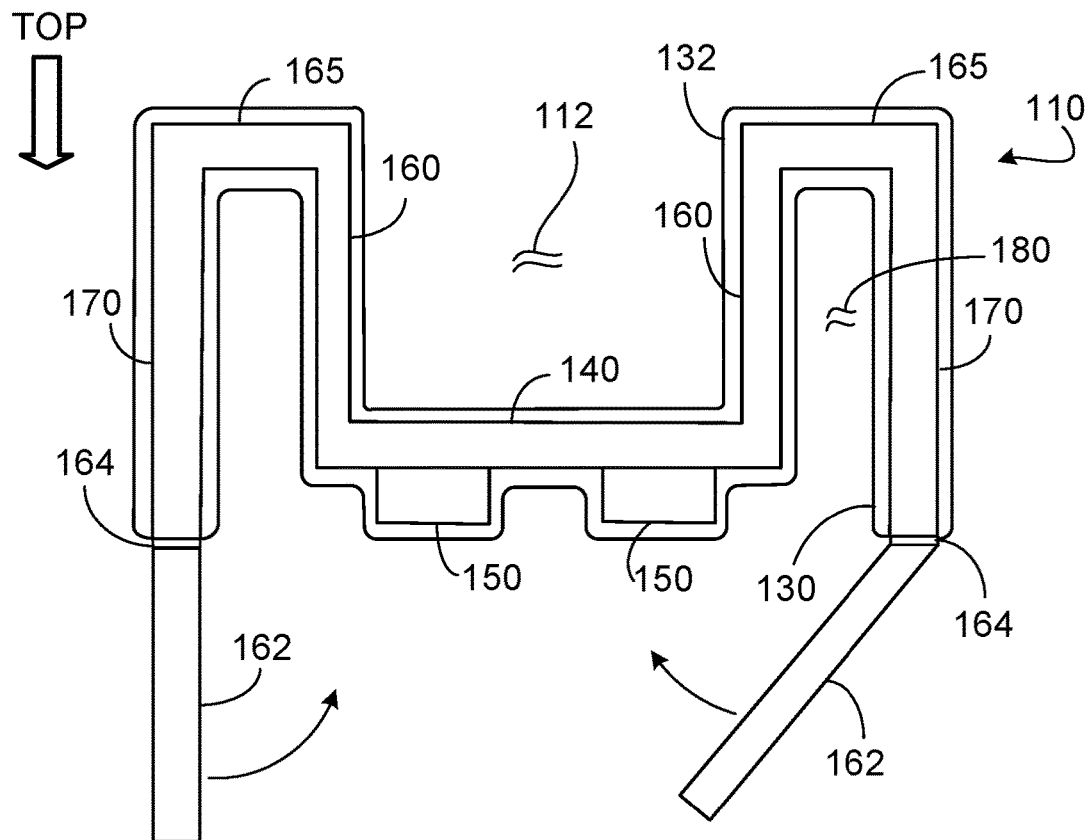
Figure 1N:
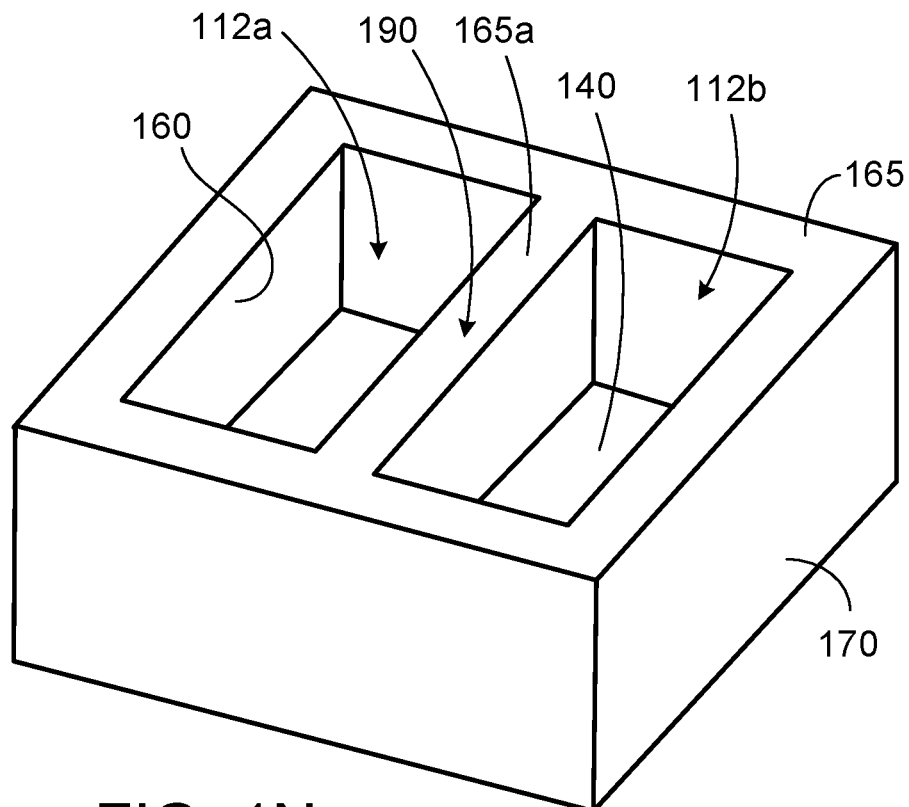
FIG. 1N is a perspective view of an implementation of thermally insulating packaging in which package has two sub-compartments.
Figure 1O:
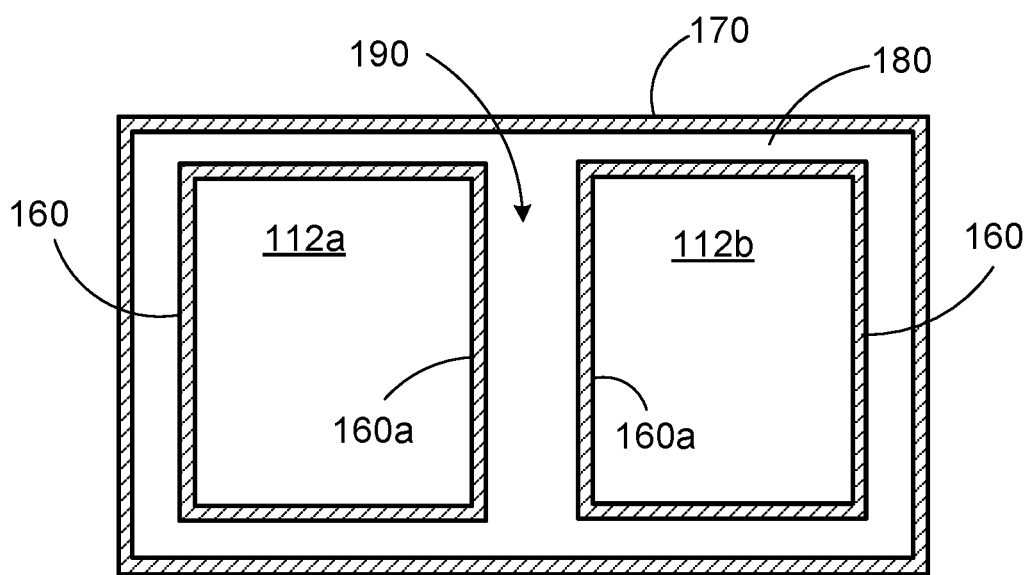
FIG. 1O is a cross-sectional view through a horizontal plane of FIG. 1N.

For example, as shown in FIGS. 1N and 1O, an interior space of a cooler can be divided into two compartments 112a, 112b by a wall 190. This permits one compartment to be used for frozen items and the other compartment to be used for refrigerated items. For example, frozen gel packs can be placed in one compartment and refrigerated gel packs could be placed in the other compartment. These compartments 112a, 112b can be completely closed off or have a through slot to allow for thermal transfer. The wall 190 can be provided by interior side walls 160a that extend upwardly from the floor 140 of the shell and are connected by a rim portion 165a.

The body 110 can also include one or more projections that project outward from the floor or side walls of the body 110. The outward projections can provide increased structural support or for cushioning of the packaging.

The body 110 can also include one or more recesses in the interior surfaces of the side walls or floor. The recesses can serve to hold the items being shipped, or to hold a coolant 260, e.g., ice, dry ice or a gel pack, or to provide increased structural support for the body 110. In some situations, the recesses are simply the result of spaces between the projections that are present for other purposes.

Where the body includes a shell, the protrusions on one side of the shell correspond to the recesses on the other side of the shell. For example, projections from the inner surface that extend inwardly into the interior space 112 correspond to complementary recesses on the outer surface. Similarly, projections from the outer surface that extend outwardly correspond to complementary recesses on the inner surface.

FIGS. 1F to 1H are perspective views of implementations of a thermally insulating packaging and show example shapes of the projections 181.

In FIG. 1F, the projections 181 are parallel rectilinear stripes. The projections 181 extend vertically on the inner surface of the side walls 169. The projections 181 extend horizontally on the inner surface of the floor 140. The spaces between the projections 181 provide grooves for air flow to improve uniformity of flow of cold air across the item held in the interior space 112.

FIG. 1G illustrates a lid to fit on the top of the tub of FIG. 1F. Again, the spaces between the projections 181 provide grooves for air flow to improve uniformity of flow of cold air across the item held in the interior space 112. In FIG. 1G, the projections 181 can have the same dimensions and spacing as the projections 181 in FIG. 1F. This permits the grooves in the "tub" of FIG. 1F to line up with the grooves in the lid of FIG. 1G.

In FIG. 1H, the projections 181 combine to define a circular recessed area, e.g., to receive a bottle. For example, individual projections can have concave vertical surfaces; the provision of multiple such projections with the concave surfaces spaced around a central axis can thus define the circular recessed area.

The stippling shown in the bottom views of FIGS. 1F and 1H indicates that the cavity 180 between the walls 160, 170 and below the floor 140 can be filled with the core material, e.g., a loose-fill compostable or recyclable material. Similarly, the stippling shown in the bottom views of FIG. 1G indicates that a cavity between the walls 160, 170 and below the floor 140 that form the cover can be filled with the core material, e.g., a loose-fill compostable or recyclable material.

The structures of the projections 181 of the body 110 are described in greater detail with reference to FIGS. 2A-4B.

In some implementations, the body 110 includes one or more pads 150 on a lower surface of the floor 140. If the lower cover is present, the pads 150 can contact the lower cover 120 and thus support the floor 140 of the body 110 above the lower cover 120. This maintains a gap between the floor 140 and the lower cover 120. The gap can be filled with a thermally insulating material, e.g., the core material as discussed above. If the lower cover 120 is absent, the pads 150 can rest on the surface supporting the packaging. This maintains a gap between the floor 140 and the surface supporting the packaging The pads 150 can absorb shock when the thermally insulating packaging 100 is placed on ground or stacked on top of other shipping packages.

The pads 150 can be continuously jointed to the outer surface of the floor 140 and be formed of the same material with the body 110. The pads 150 can have any suitable shapes to absorb shock. For example, the pads 150 can have a cross shape as illustrated in FIG. 1A, a circular shape, or a rectangular shape. The pads 150 can have a thickness, e.g., 0.5 to 4 inches. The bottom of the pads 150 can be coplanar with the bottom of the outer side walls 160.

FIG. 1E is a bottom view of a floor a fourth implementation of a thermally insulating packaging. The thermally insulating packaging 100 includes the pads 150 and outer protrusions 152 on the outer surface of the floor 140. The pads 150 and the outer protrusions 152 are continuously joined to the outer surface of the floor 140 and are primarily formed of the same material with the body 110.

The pads 150 and the outer protrusions 152 can be arranged various ways. For example, the pads 150 and the outer protrusions 152 can be alternately arranged. In addition, two adjacent pads 150 and two adjacent outer protrusions 152 can be diagonally arranged. Adjacent pads 150 and protrusions 152 can be connected by struts 156, which are additional protrusions that are shorter than the pads 150 and protrusions 152. These struts 156 provide improved structural support for the packaging 100. In some implementations, the struts 156 can have the same height with the pads 150 or the protrusions 152.

The pads 150 can have any suitable shapes to absorb shock as described above. The outer protrusions 152 can also have any suitable shapes based on a shape of the projections. For example, where the projections are designed to hold bottles, as illustrated in FIG. 1E, the recesses on the inner side of the body that are complementary to the outer protrusions 152 can have a circular shape to bottles.

In some implementations, the pads 150 can be separately formed and be attached to the body 110. In these implementations, the pads 150 can be formed of a different material from the material used for the body 110. For example, the pads 150 can be formed of a material that provides more cushion to the body 110 than the material used for the body 110.

In some implementations, the bottom of the thermally insulating packaging 100 is closed off by a lower cover 120 to cover the cavity 180 or material, e.g., the material of the core 182, in the cavity 180.

Referring to FIGS. 1A and 1B, the thermally insulating packaging 100 can include a separate cover 120 that is primarily formed of a compostable or recyclable material(s). The cover 120 can enclose the inner surface of the floor 140 and the space 180 of the body 110. In some implementations, the cover 120 can be snuggly fit to bottom rims 155 of the outer side walls 160. In some other implementations, the cover 120 can include grooves or protrusions on edges of the cover 120 to be coupled with the body 110. Example methods of coupling the cover 120 to the body 110 are described in greater detail with reference to FIGS. 5A to 5D.

FIG. 1C is a cross-sectional view of a second implementation of the thermally insulating packaging. In this example, the thermally insulating packaging 100 does not include a separate cover 120. Portions 162 of the outer side walls 160 are hinged at a joint 164 of the outer side walls 160. The portions 162 provide flaps to cover the inner surfaces of the floor and the space 180 of the body 110. Although FIG. 1C illustrates two flaps, there could be just one flap.

In some implementations, the outer and/or inner surfaces of the outer walls 160, the inner walls 170, and the floor 140 can be optionally covered by a moisture barrier layer 130 and/or 132. Details of the layers 130, 132 are described in greater detail below.

In some implementations, referring to FIGS. 1J and 1K, the surfaces of the floor 140 and the side walls, e.g., inner side walls 160, that are closer to the interior space 112 are covered by a moisture barrier layer 132. The moisture barrier layer can be formed of the same material and have the thickness with the moisture barrier layer 130 discussed below. The moisture barrier layer 132 can extend over just the inner surface of the floor 140 and inner walls 160, or also extend over the rim and/or outer walls 170, as shown in FIGS. 1L and 1M.

In some implementations, referring to FIGS. 1B and 1C, e.g., where the body provide as shell with a gap between inner walls 160 and outer walls 170, the surfaces of the walls 160, 170 that are closer to the cavity 180 are covered by a moisture barrier layer 130.

In some implementations, referring to FIGS. 1L and 1M, both the surfaces adjacent the interior space 112 and the surfaces closer to the cavity 180 are covered by the moisture barrier layers 130, 132. Although FIGS. 1L and 1M show the moisture barrier layer 130 on the interior surface, as noted above this is optional; only the outer moisture barrier layer 132 could be present.

As illustrated in FIG. 1A, when the cover 120 is coupled to the body 110, the bottom of the body 110 is covered by the cover 120 and the top of the body 110 includes an opening to the interior space 112.

In some implementations, the interior space 112 can be covered by a lid. The lid can be primarily formed of a compostable or recyclable material(s). In some other implementations, the interior space 112 can be covered by another thermally insulating article, so that together the two articles for the thermally insulating packaging. Examples of covering the interior space by a thermally insulating article are described with reference to FIGS. 2A to 4B.

As noted above, in some implementations, the thermally insulating packaging 100 includes one or more protrusions that extend from one or more of the inner sidewall(s) 170 and/or the floor 140 into the interior space 112. For example, the protrusion can include a wall or strut that sections the interior space 112 into separate subspaces; this may be useful for restraining items to be shipped or for increasing structural strength of the body. As another example, the protrusion can be a bump or dimple; this may be useful for restraining or cushioning items in the interior space 112.

Inner Structure of Thermally Insulating Packaging I

Figure 2A:
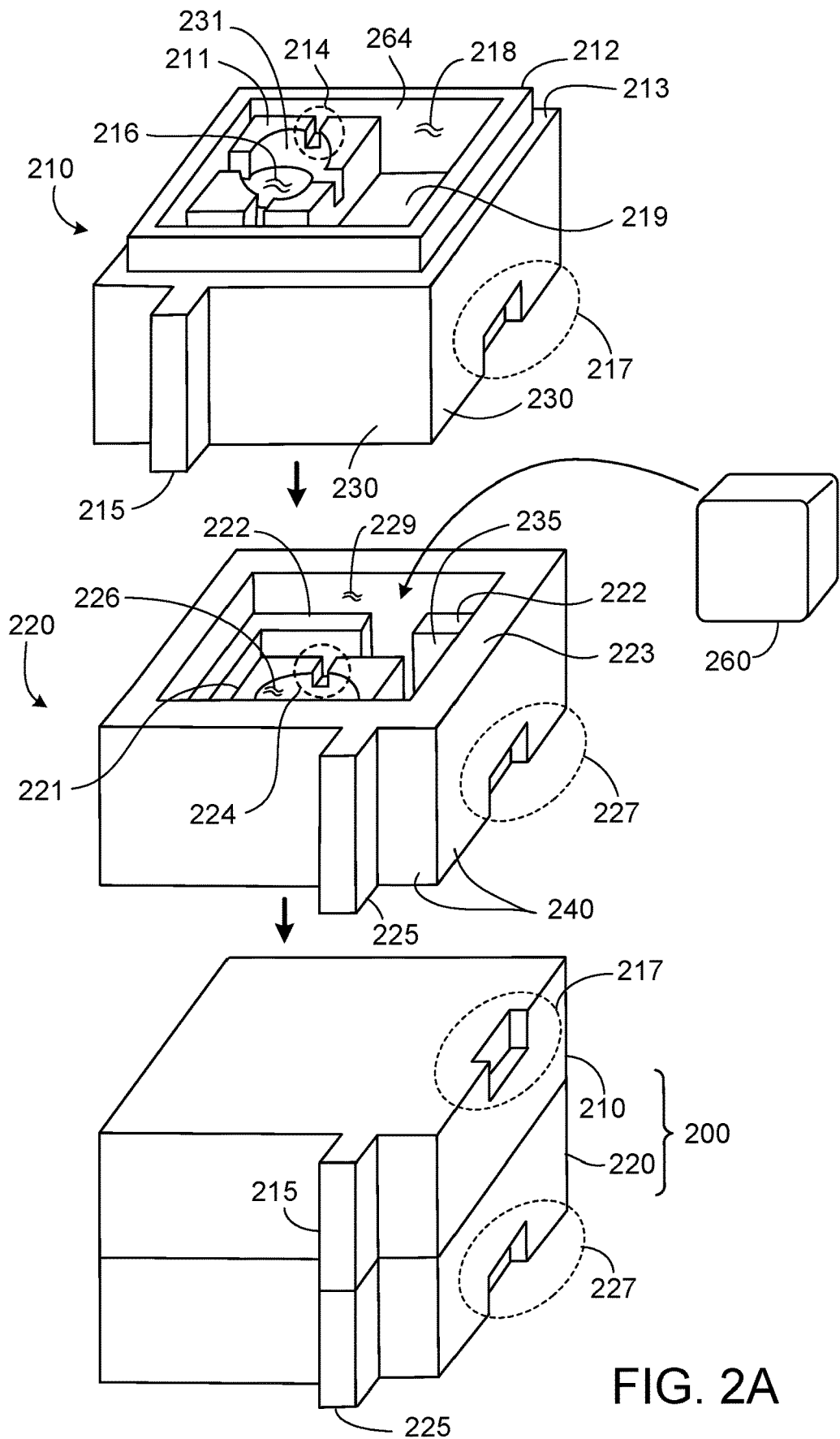
FIG. 2A is a perspective view of a first implementation of a pair of thermally insulating articles that form a shipping package.
Figure 2B:
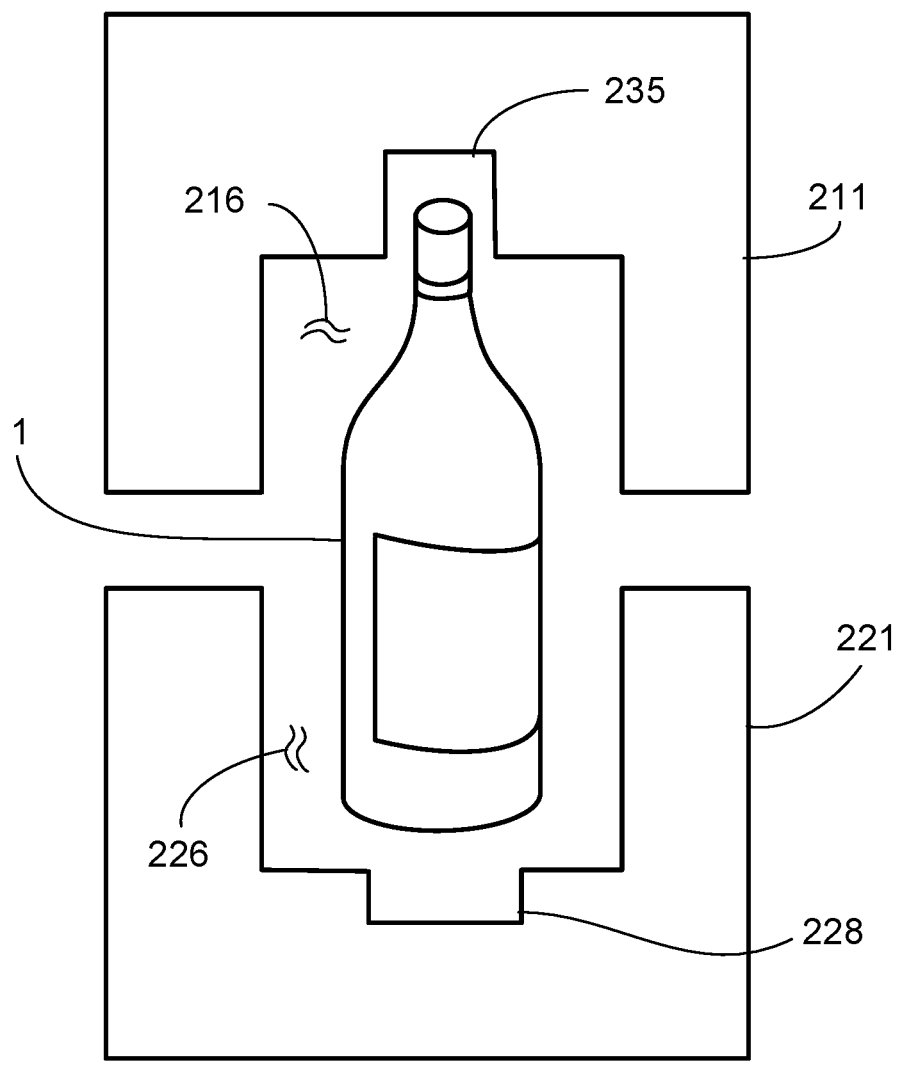
FIG. 2B is a cross-sectional view of the pair of thermally insulating articles of FIG. 2A.

FIG. 2A is a perspective view of a first implementation of thermally insulating packaging. FIG. 2B is a cross-sectional view of a first implementation of thermally insulating packaging. The thermally insulating packaging 210, 220 can be the example thermally insulating packaging 100 described with reference to FIG. 1.

The first thermally insulating packaging 210 includes a first floor 219, first inner side walls, and first outer side walls 230. Details regarding the first floor 219, the inner side walls, and the first outer side walls 230 of the thermally insulating packaging 210 of FIG. 2A, e.g., overall structures, dimensions, and possible material compositions for the compostable materials, can be the same as the thermally insulating packaging 100 described with reference to FIG. 1.

The thermally insulating packaging 210 further includes the first projection 211. In FIG. 2A, the thermally insulating packaging 210 is illustrated as including one first projection 211. However, in some implementations, the thermally insulating packaging 210 can include multiple first projections on an inner surface of the first floor 219. The first projection 211 includes side walls 231 to hold the item. For example, the side walls 231 can be curved to effectively hold an item that has a curved surface, e.g., a bottle. The side walls 231 and a floor of the first projection 211 define an interior space 216 of the first projection 211. The item is accommodated in the interior space 216.

Referring to FIG. 2B, some portions of the item 1 are accommodated in the interior space 216 of the first projection 211 and other portions of the item 1 are accommodated in the interior space 226 of the second projection 212. In particular, the first projection 211 holds a first portion of the item 1. In some implementations, the first projection 211 can include a groove 235 on the floor of the first projection. In particular, where the item 1 has a narrow portion, e.g., a bottle neck, the groove 235 can help the narrow portion of the item fit snugly in the interior space 216 of the first projection 211. In some implementations, the first projection 211 and the second projection 221 can be symmetric. In some implementations, the first projection 211 and the second projection 221 are not symmetric. For example, the interior space 216 can have a shape different from that of the interior space 226 and/or the groove 235 can have a shape different from that of the groove 228.

Referring back to FIG. 2A, the first projection 211 is located in the first interior space 218 defined by the floor 219 and the side walls 230. In some implementations, the first projection 211 is continuously joined to the floor 219 and the inner surfaces 264 of the side walls 230 and is primarily formed of the same material with the thermally insulating packaging 210.

In some implementations, the first projection 211 can include one or more grooves 214 on the curved side walls of the first projection 211. The grooves 214 helps cold air cooled by a coolant 260 efficiently spread out in the interior space 218. In particular, the grooves 214 can increase the surface area of the item contacting cold air so that materials inside the item, e.g., a liquid, such as milk, fruit juice, or wine, in a bottle, or the item itself, e.g., packed meat or fish, can maintain freshness.

In some implementations, the first thermally insulating packaging 210 can include a protrusion 215 on the outer surface of the outer side wall 230. The protrusion 215 can have the same or a smaller height than the height of the outer side wall 230. The protrusion 215 can have box-like shape, e.g., a generally rectilinear prism. In some implementations, the edges of the protrusion 215 can be rounded, while remaining a generally rectilinear prism. The protrusion 215 can protect the first thermally insulating packaging 210 from being hit by other boxes in lateral directions. For example, when the first thermally insulating packaging 210 is placed with other boxes laterally, the protrusion 215 can keep a gap between the first thermally insulating packaging 210 and other boxes such that other boxes cannot directly hit the side walls 230 of the first thermally insulating packaging 210.

In some implementations, the first thermally insulating packaging 210 can include a groove 217 on the outer surface of the outer side wall 230 that is shaped for a hand grip. The groove 217 can be located on one of the bottom edges of the side walls 230. A user can insert his or her hand into the groove 217 to carry the first thermally insulating packaging 210 easily.

The second thermally insulating packaging 220 includes a second floor, second inner side walls, second outer side walls 240, and a second projection 222. The second thermally insulating packaging 220 can further include a protrusion 225 and a groove 227 for a hand grip. Details regarding the second floor, the second inner side walls, the second outer side walls 240, the second projection 222, the protrusion 225, and the groove 227 of the second thermally insulating packaging 220, e.g., overall structures, dimensions, and possible material compositions for the compostable materials, can be the same as the first thermally insulating packaging 210.

The second thermally insulating packaging 220 further includes side walls 235 on inner surfaces of the outer side walls 230. The side walls 235 have the height that is smaller than the height of the outer side walls 230. Thus, the second thermally insulating packaging 220 includes two rim portions 222, 223 in a different level. On the other hand, the first thermally insulating packaging 210 further includes protrusions 212 on the rims 213 of the side walls 230.

In FIG. 2A, if the first thermally insulating packaging 210 is turned over and is placed on top of the second thermally insulating packaging 220, the rims 213 of the first thermally insulating packaging 210 are coupled to the rims 223 of the second thermally insulating packaging 220 and the protrusions 212 of the first thermally insulating packaging 210 are coupled to the rims 222 of the second thermally insulating packaging 220. As a result, the first thermally insulating packaging 210 can be coupled to the second thermally insulating packaging 220. The coupled packagings 210, 220 can be shipped as a single shipping package 200. In this example, the protrusion 215 of the first thermally insulating packaging 210 can align with the protrusion 225 of the second thermally insulating packaging 220.

In some implementations, the first thermally insulating packaging 210, the second thermally insulating packaging 220, or both of them can include a groove or slot 229 to accommodate a coolant 260. For example, in FIG. 2A, a portion of the side walls 235 has the groove or slot 229 to accommodate the coolant 260. The second thermally insulating packaging 220 can spread cold air cooled by the coolant 260 so that materials being shipped can maintain freshness. Optionally, the groove or slot 229 can have a holding mechanism to hold the coolant 260 so that the coolant 260 can be fixed while the first thermally insulating packaging 210 is shipped.

In some implementations, as described above, the first thermally insulating packaging 210 can include multiple first projections 211. In these implementations, the first thermally insulating packaging 210 can include one or more grooves or slots between the adjacent first projections 211 to accommodate the coolant 260.

In some implementations, the first projection 211 can be separately formed and be attached to the floor 219 and the inner surfaces 264 of the side walls 230. In these implementations, the first projection 211 can be formed of a different material from the material used for the thermally insulating packaging 210. For example, the first projection 211 can be formed of a material that provides more cushion to the item than the material used for the body 110.

Figure 2C:
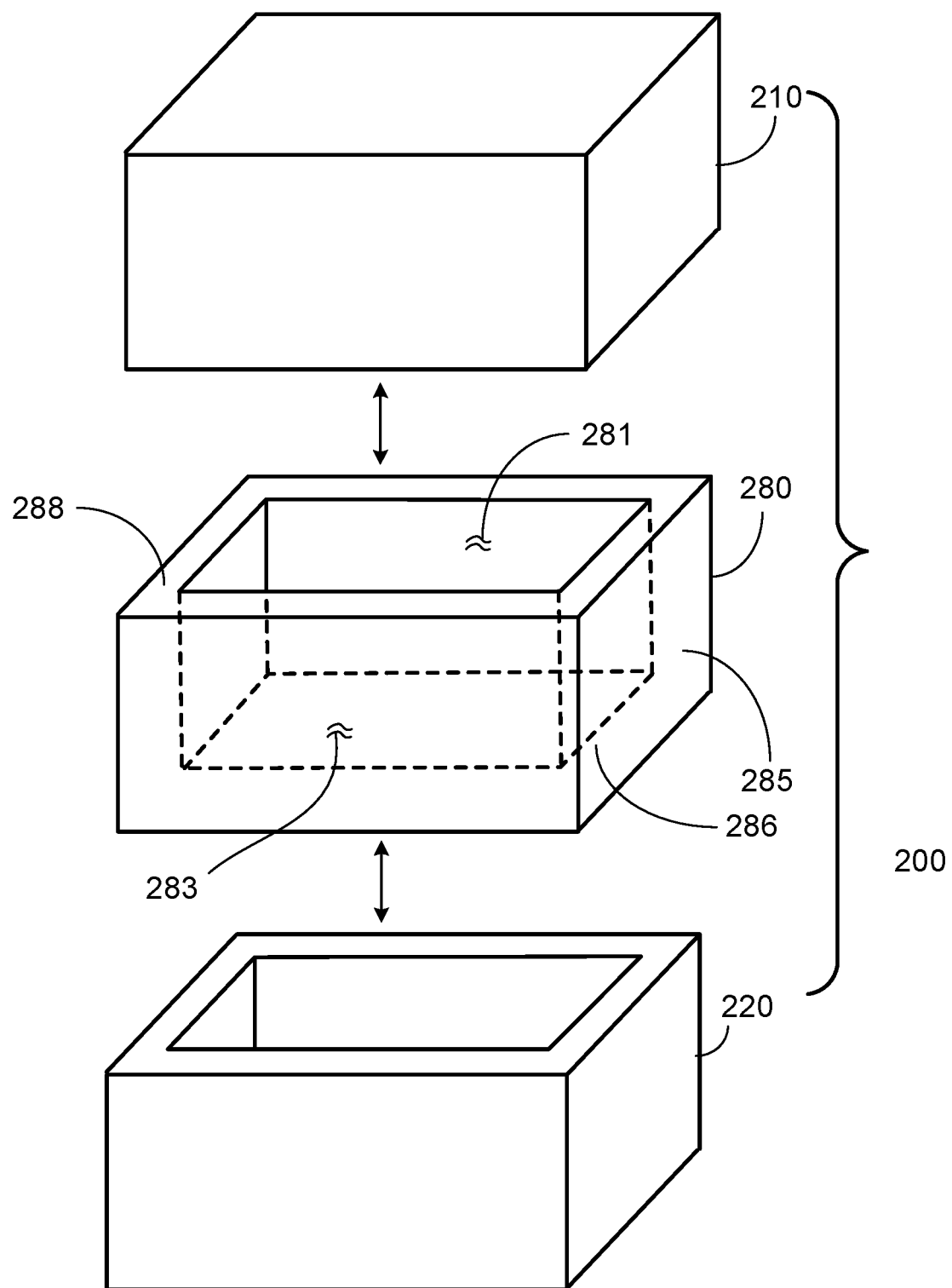
FIG. 2C is a perspective view of a second implementation of a set of thermally insulating articles that form a shipping package.

FIG. 2C is a perspective view of a second implementation of a set of thermally insulating packagings that form a thermally insulating shipping package. The thermally insulating shipping package 200 includes the first thermally insulating packaging 210, the second thermally insulating packaging 220, and one or more thermally insulating extenders 280, e.g., up to ten extenders.

Each extender 280 generally takes the form of an annular body that is open at the top and the bottom. The extender 280 can have a generally rectangular perimeter. Of course, the edges of the body can be rounded, while remaining a generally rectangular. In addition, the extender could have other shapes, e.g., octagonal, cylindrical, etc.

For example, the extender in FIG. 2C includes a first opening 281, a second opening 282, side walls defining the first opening and the second opening, and first rims 288, and second rims 286. The first rims 288 are coupled to the rims 213 of the first thermally insulating packaging 210 and the second rims 286 are coupled to the rims 223 of the second thermally insulating packaging 220. As a result, the first thermally insulating packaging 210, the extender 280, and the second thermally insulating packaging 220 can form the single shipping package 200. Coupling mechanisms between the extender 280 and the thermally insulating packagings 210, 220 are described in greater detail with reference to FIG. 5A to 5D.

Figure 2D:
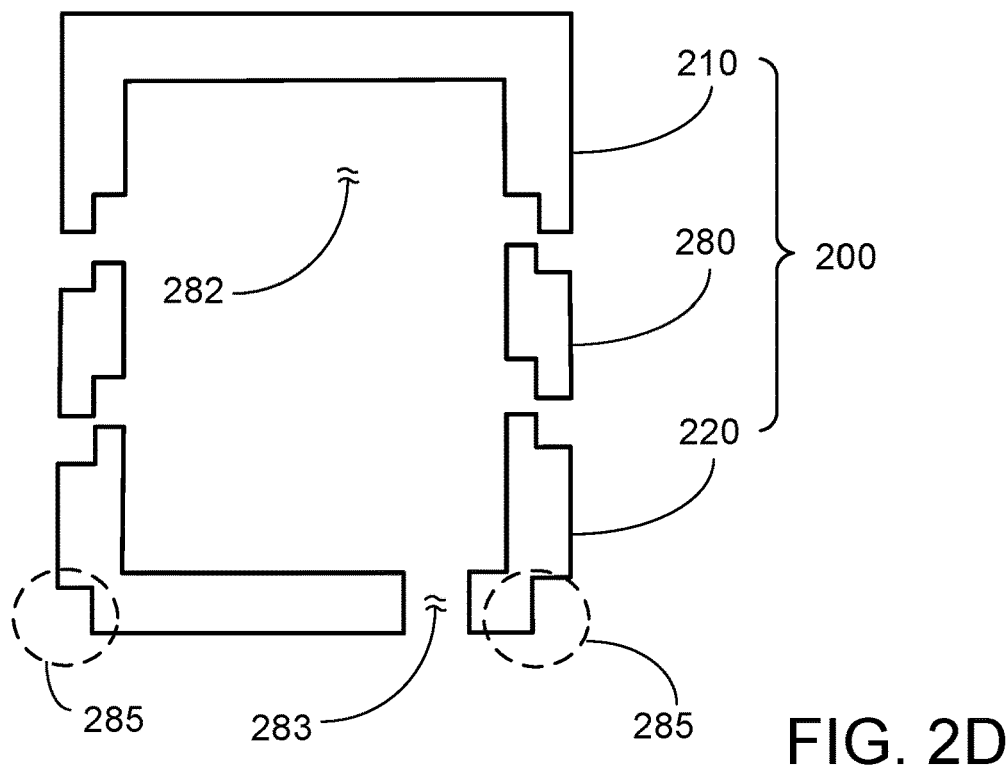
FIG. 2D is a cross-sectional view of a first implementation of the set of thermally insulating articles of FIG. 2C.

FIG. 2D is a cross-sectional view of the set of articles of FIG. 2C. The extender 280 couples two thermally insulating packagings 210, 220 such that the interior space 282 can be extended. In some implementations, multiple extenders can be coupled between the first thermally insulating packaging 210 and the second thermally insulating packaging 220. Thus, the interior space 282 of the shipping package 200 can be extended as much as a user wants.

Figure 2E:
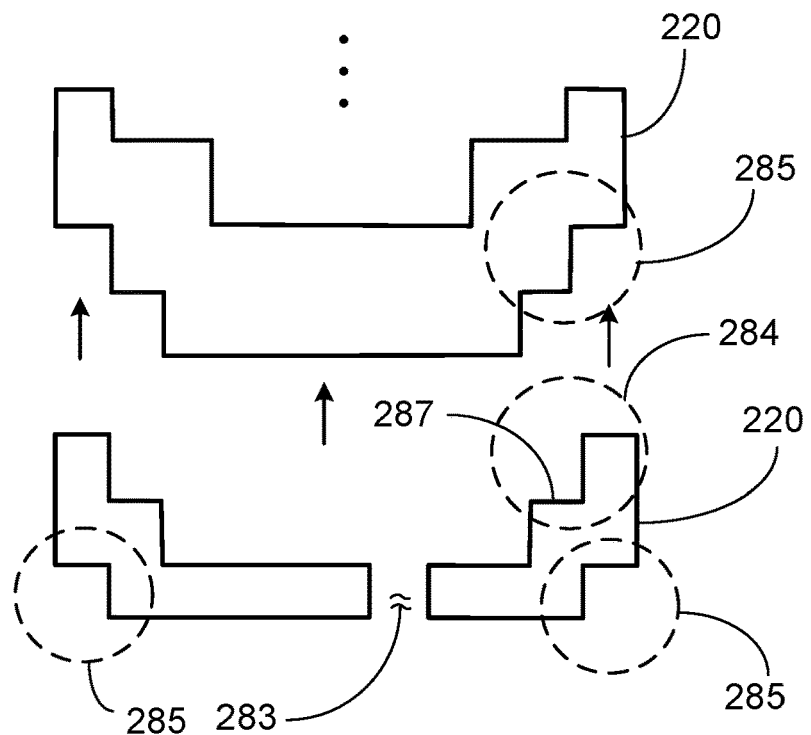
FIG. 2E is a cross-sectional view of a second implementation of the set of thermally insulating articles of FIG. 2C.

Optionally, as shown in FIG. 2E, one of the pieces of the thermally insulating packaging 200, e.g., the lower section 220, can include one or more recesses 285, in which projections 284 on the top surface of the rim 287 of the lower section 220 will fit. This permits the lower section 220 to act as a stackable tray, with multiple lower sections stacked vertically. The recesses 285 can be a cut-out on the edges of the packaging 220 or grooves formed on the underside of the packaging 220. Having the projections 284 inserted into the recesses 285 assists in stability of the overall packaging 100, e.g., if packaging 200 is moved then it is less likely that the individual trays will slide or topple.

In addition, the thermally insulating packaging 220 can include one or more slots 283 on the floor of the thermally insulating packaging 220 to discharge liquid from the interior area 282 to an exterior area of the thermally insulating packaging 220. For example, condensed liquid in the interior can be discharged through the slots 283.

Inner Structure of Thermally Insulating Packaging II

Figure 3A:
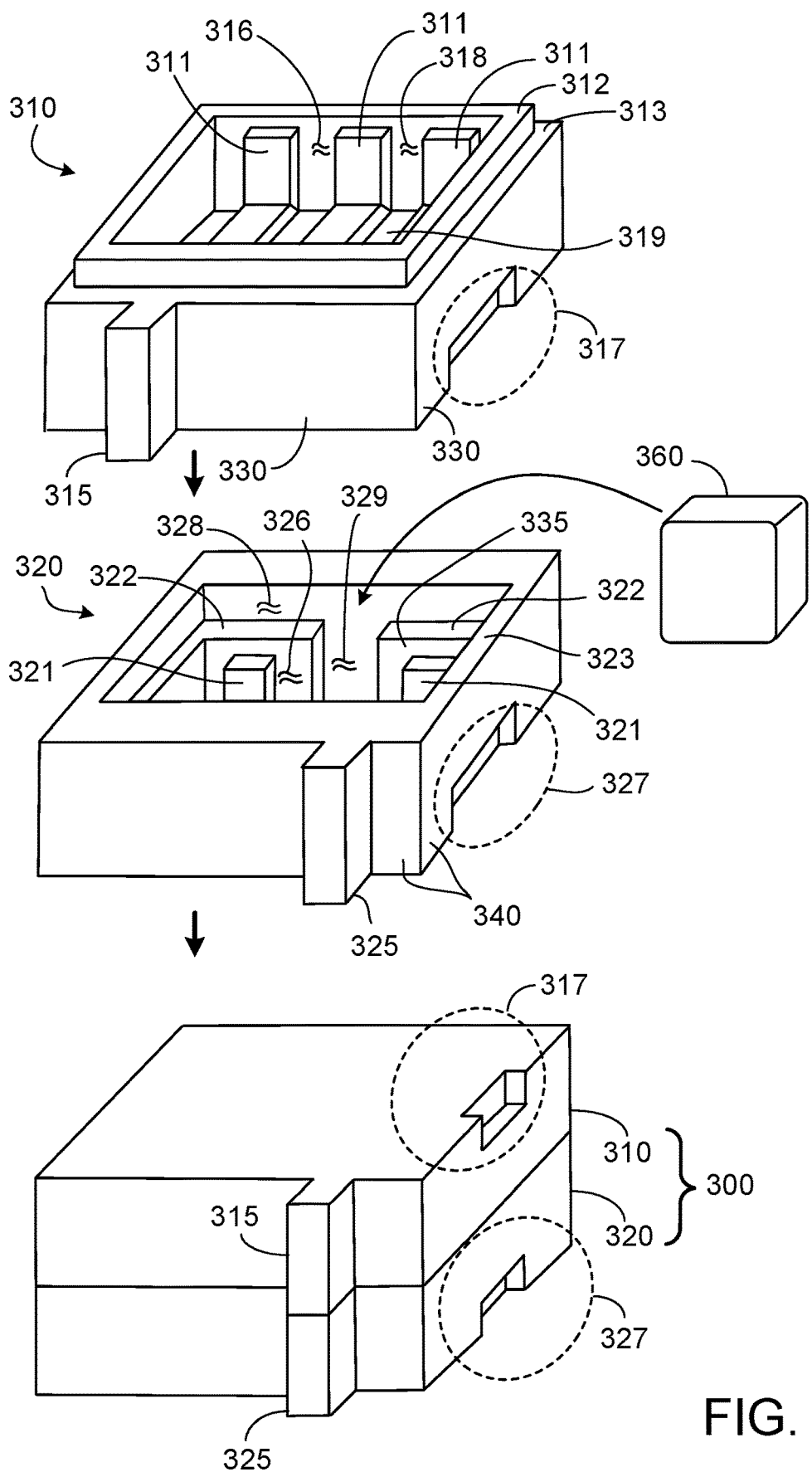
FIG. 3A is a perspective view of a second implementation of a pair of thermally insulating articles that form a shipping package.
Figure 3B:
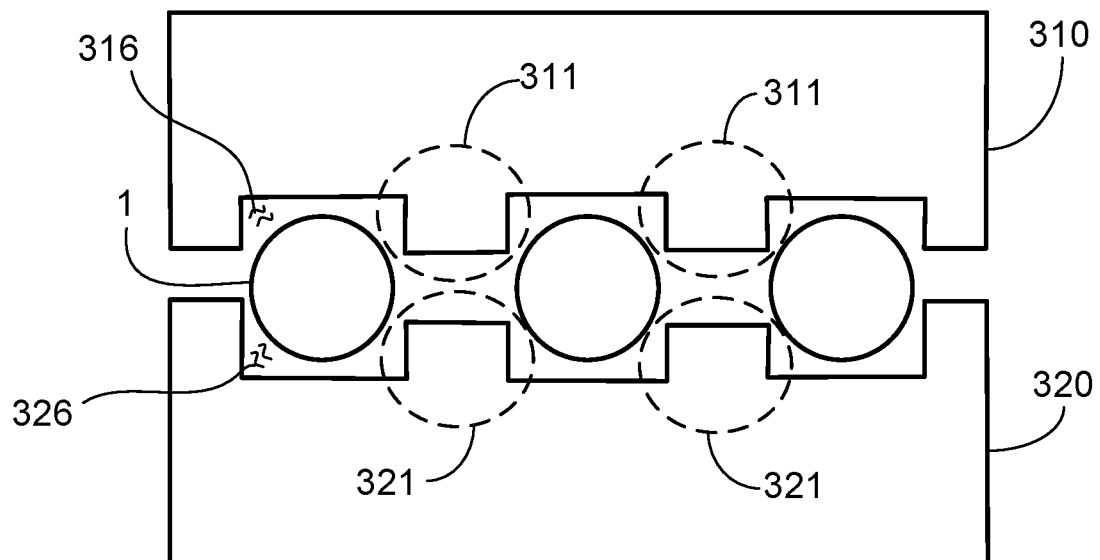
FIGS. 3B and 3C are cross-sectional views of the pair of thermally insulating articles of FIG. 3A.
Figure 3C:
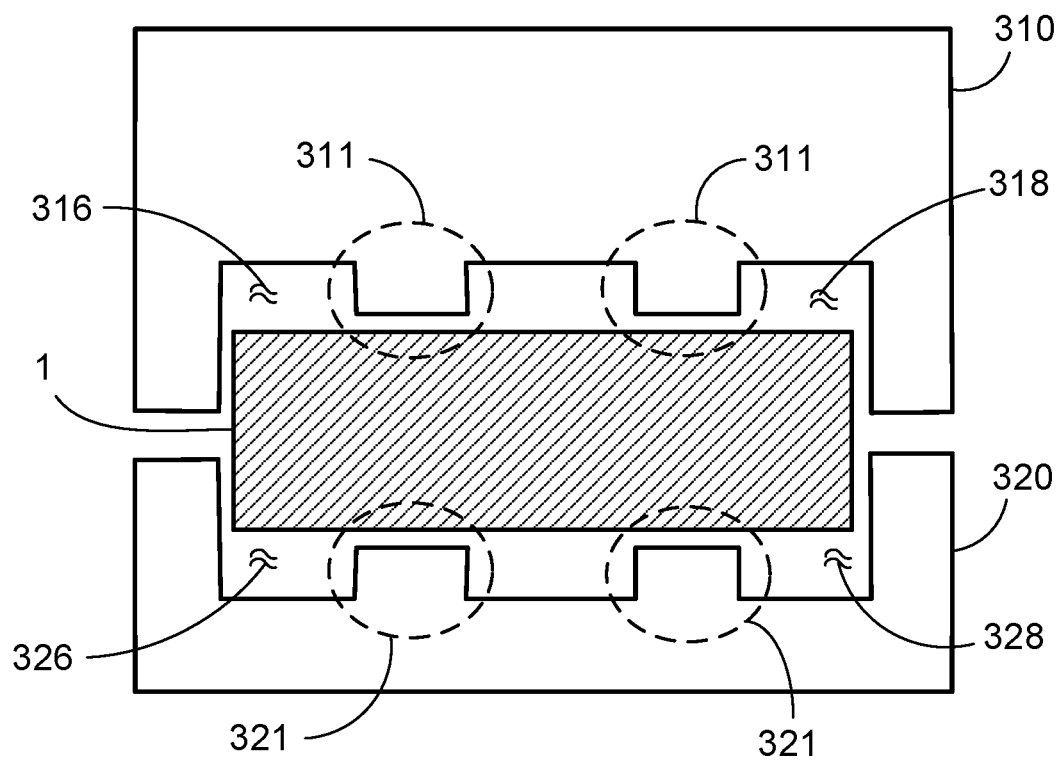

FIG. 3A is a perspective view of a second implementation of thermally insulating packaging. FIG. 3B is a cross-sectional view of a second implementation of thermally insulating packaging. The thermally insulating packaging 310, 320 can be the example thermally insulating packaging 100 described with reference to FIG. 1.

The first thermally insulating packaging 310 includes a first floor 319, first inner side walls, and first outer side walls 330. Details regarding the first floor 319, the inner side walls, and the outer side walls 330 of the thermally insulating packaging 310 of FIG. 3A, e.g., overall structures, dimensions, and possible material compositions for the compostable materials, can be the same as the first thermally insulating packaging 210 described with reference to FIG. 2A.

The thermally insulating packaging 310 further includes the first projections 311. The first projections 311 protrudes from inner surfaces of the outer side walls 330 and/or the floor 319. For example, each of the first projections 311 can have a box-like shape, e.g., a generally rectilinear prism. In some implementations, the edges of the protrusion 315 can be rounded, while remaining a generally rectilinear prism. The first projections 311 can extend in parallel each other to define a groove 316 between two adjacent first projections 311.

In some implementations, the grooves 316 are shallow, and primarily serve to provide for air flow such that cold air can reach all around the item being shipped.

In some implementations, referring to FIG. 3B, the first projections 311 can hold the item 1 in the groove 316. A portion of the item 1, e.g., a bottle, can be accommodated in the groove 316. In some implementations, referring to FIG. 3C, the first projections 311 hold the item 1 in the interior space 318. The interior space 318 is a space defined by the floor 319 and the outer side walls 330 of the first thermally insulating packaging 310. A portion of the item, e.g., a meat package, can be accommodated in the interior space 318. In these implementations, the groove 316 helps cold air cooled by a coolant 360 efficiently spread out in the interior space 318. In particular, the groove 316 can maximize surface of the item contacting cold air so that materials, e.g., juice or wine, inside the item, e.g., a bottle, or the item itself, e.g., packed meats or fishes, can maintain freshness.

Figure 3D:
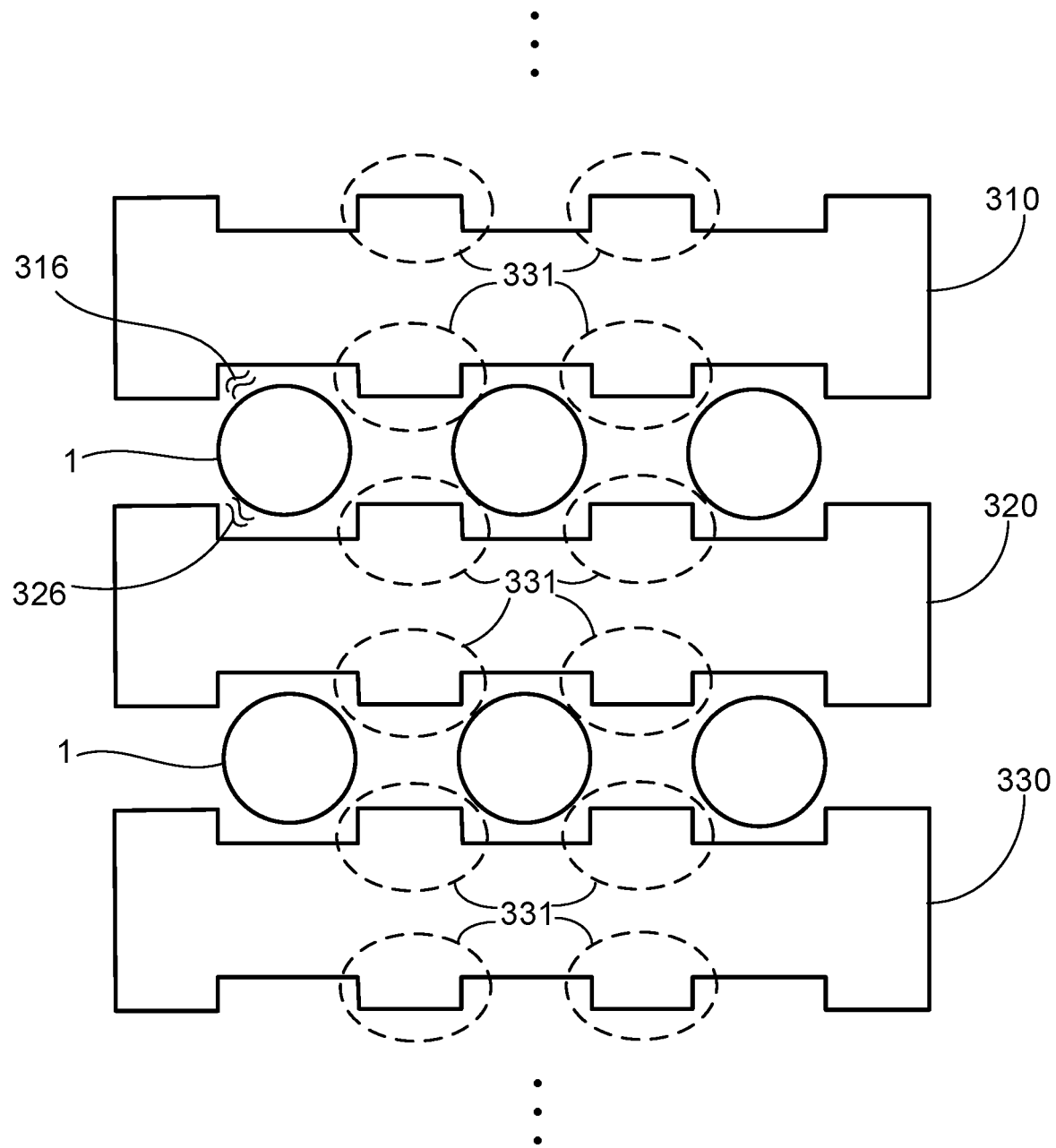
FIG. 3D is a cross-sectional view of a third implementation of a pair of thermally insulating articles.

In some implementations, referring to FIG. 3D, the thermally insulating packagings 310, 320, 330 include the projections 311, 321, 331 on both the top surface and the bottom surface of the thermally insulating packagings 310, 320, 330. When each of the thermally insulating packagings 310, 320, 330 are stacked, multiple items 1 can be stored in the spaces 316, 326 between the adjacent packagings. It can increase the storing capacity.

Referring back to FIG. 3A, in some implementations, the first projections 311 can be part of the thermally insulating packaging 310 and be primarily formed of the same material with the thermally insulating packaging 310. In some other implementations, the first projections 311 can be separately formed and be attached to the thermally insulating packaging 310. In these implementations, the first projections 311 can be formed of a different material from the material used for the thermally insulating packaging 310. For example, the first projections 311 can be formed of a material that provides more cushion to the item than the material used for the second thermally insulating packaging 310.

Like the first thermally insulating packaging 210 described with reference to FIG. 2A, the first thermally insulating packaging 310 can include a protrusion 315 and a groove 317. Details regarding the protrusion 315 and the groove 317 of the thermally insulating packaging 310 of FIG. 3A, e.g., overall structures, dimensions, and possible material compositions for the compostable materials, can be the same as the first thermally insulating packaging 210 described with reference to FIG. 2A.

Furthermore, details regarding the second thermally insulating packaging 320 and a single shipping package 300, e.g., overall structures, dimensions, and possible material compositions for the compostable materials, can be the same as the second thermally insulating packaging 210 and the single shipping package 200 described with reference to FIG. 2A.

Inner Structure of Thermally Insulating Packaging III

Figure 4A:
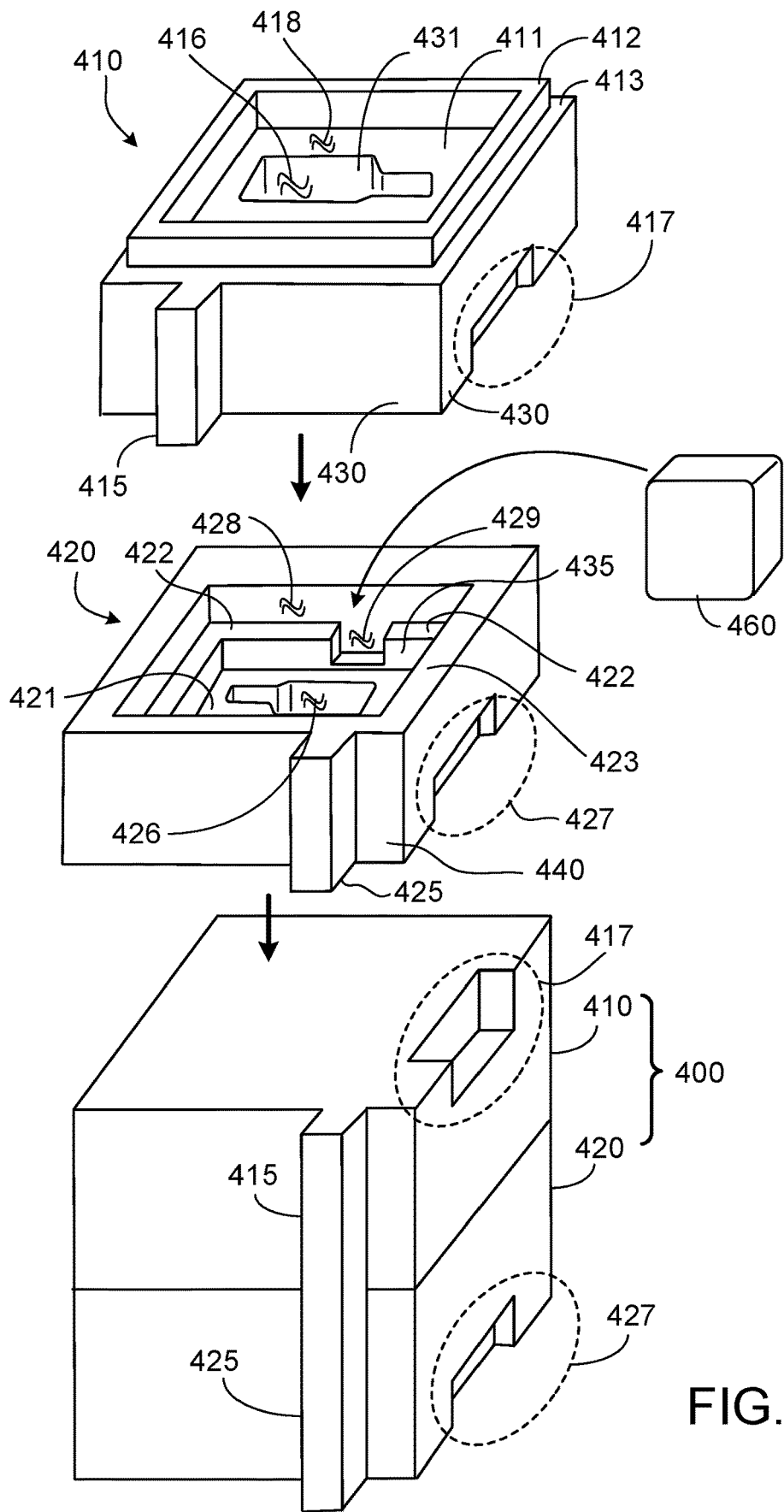
FIG. 4A is a perspective view of a fourth implementation of a pair of thermally insulating articles that form a shipping package.
Figure 4B:
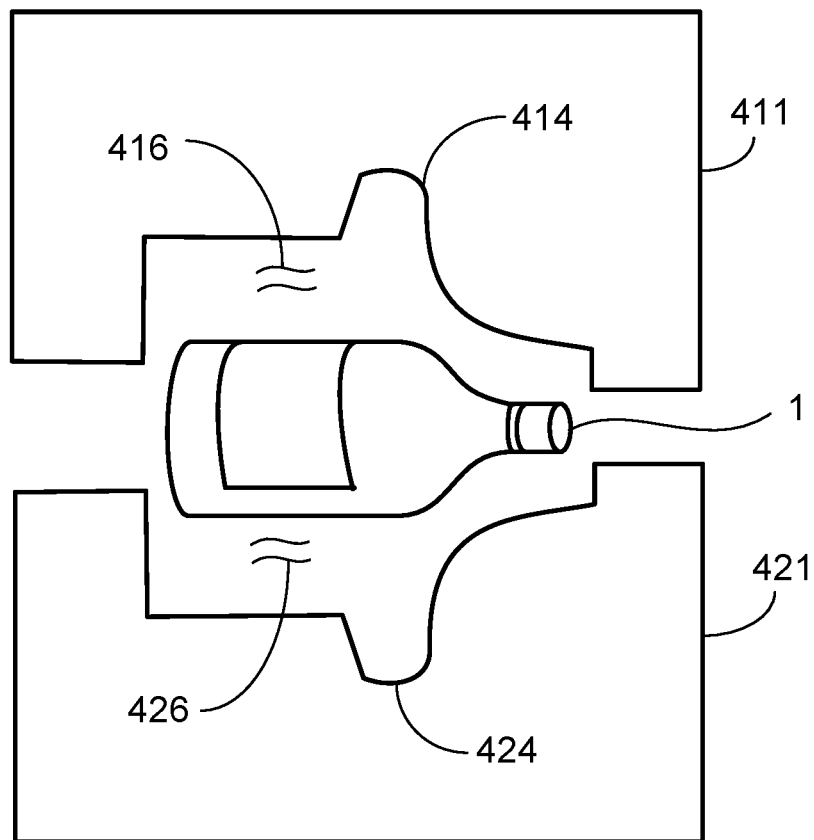
FIG. 4B is a cross-sectional view of the pair of thermally insulating articles of FIG. 4A.

FIG. 4A is a perspective view of a third implementation of thermally insulating packaging. FIG. 4B is a cross-sectional view of a third implementation of thermally insulating packaging. The thermally insulating packagings 410, 420 can be the example thermally insulating packaging 100 described with reference to FIG. 1.

The first thermally insulating packaging 410 includes a first floor, first inner side walls, and first outer side walls 430. Details regarding the first floor, the inner side walls, and the outer side walls 430 of the thermally insulating packaging 410 of FIG. 4A, e.g., overall structures, dimensions, and possible material compositions for the compostable materials, can be the same as the first thermally insulating packaging 210 described with reference to FIG. 2A.

The thermally insulating packaging 410 further includes the first projection 411. In FIG. 4A, the thermally insulating packaging 410 is illustrated as including one first projection 411. However, in some implementations, the thermally insulating packaging 410 can include multiple first projections on an inner surface of the first floor. The first projection 411 includes side walls 431 to hold the item. For example, the side walls 431 can be curved to hold the item that has a curved surface efficiently. The side walls 431 and a floor of the first projection 411 define an interior space 416 of the first projection 411. The item is accommodated in the interior space 416. Referring to FIG. 4B, some portions of the item 1 are accommodated in the interior space 416 of the first projection 411 and other portions of the item 1 are accommodated in the interior space 426 of the second projection 412.

In some implementations, the first projection 411 can include one or more grooves 414 on the curved side walls of the first insert 411. The grooves 414 helps cold air cooled by a coolant 460 efficiently spread out in the interior space 418. In particular, the grooves 414 can maximize surface of the item contacting cold air so that materials, e.g., juice or wine, inside the item, e.g., a bottle, or the item itself, e.g., packed meats or fishes, can maintain freshness.

Like the first thermally insulating packaging 210 described with reference to FIG. 2A, the first thermally insulating packaging 410 can include a protrusion 415 and a groove 417. Details regarding the protrusion 415 and the groove 417 of the thermally insulating packaging 410 of FIG. 4A, e.g., overall structures, dimensions, and possible material compositions for the compostable materials, can be the same as the first thermally insulating packaging 210 described with reference to FIG. 2A.

Furthermore, details regarding the second thermally insulating packaging 420 and a single shipping package 400, e.g., overall structures, dimensions, and possible material compositions for the compostable materials, can be the same as the second thermally insulating packaging 210 and the single shipping package 200 described with reference to FIG. 2A.

Cover

FIG. 5A is a cross-sectional view of a first implementation of a cover to a thermally insulating packaging. The thermally insulating packaging 100 includes the body 110 and the cover 120. The cover 120 includes grooves 31 on the edges of the cover 120. The body 110 includes protrusions on the rims 155 of the outer side walls 160. The protrusions 32 of the body 110 can be coupled to the grooves 31 of the cover 120 such that the cover 120 can be firmly coupled to the body 110 by the friction between the grooves 31 and the protrusions 32.

FIG. 5B is a cross-sectional view of a second implementation of a cover to a thermally insulating packaging. The thermally insulating packaging 100 includes the body 110 and the cover 120. The cover 120 can be coupled to the body 110 using an adhesive.

FIG. 5C is a cross-sectional view of a third implementation of a cover to a thermally insulating packaging. The thermally insulating packaging 100 includes the body 110 and the cover 120. The cover 120 includes protrusions 41 adjacent to the edges of the cover 120. The body 110 includes grooves 42 on the rims 155 of the outer side walls 160. The protrusions 41 of the cover 120 110 can be coupled to the grooves 42 of the body 110 such that the cover 120 can be firmly coupled to the body 110 by the friction between the grooves 42 and the protrusions 41.

FIG. 5D is a cross-sectional view of a fourth implementation of a cover to a thermally insulating packaging. The thermally insulating packaging 100 includes the body 110 and the cover 120. The cover 120 includes protrusions 53 adjacent to the edges of the cover 120. The body 110 includes protrusions 52 on the rims 155 of the outer side walls 160. When the cover 120 is placed to cover the body 110, side surfaces of the protrusions 52 are coupled to side surfaces of the protrusions 53 such that the cover 120 can be firmly coupled to the body 110 by the friction between the protrusions 52 and the protrusions 53.

The cover 120 can be made of compostable materials. In some implementations, the cover 120 can be made of the same compostable material that is used for the body 110. In some other implementations, the cover 120 can be made of a compostable material that is different from the compostable material used for the body 110.

Similar to the body 110, the cover 120 can be a single-piece panel formed of the compostable material, or can include a shell of compostable material that at least partially encloses a core of compostable material.

In some implementations, the cover 120 has a length and a width that match the bottom of the body 110.

In some implementations, a water-proof, water-resistant or water-repellant layer can fully enclose the cover 120. For example, the layer can enclose all the surfaces of the cover 120. In some other implementations, the layer can enclose the cover 120 in part. For example, the layer can enclose a particular surface, e.g., an interior surface or an exterior surface, of the cover 120 or a portion of a particular surface, e.g., a bottom portion or an upper portion of the interior surface, of the cover 120.

The coupling mechanisms described with reference to FIGS. 5A to 5D can be also used to couple two thermally insulating packagings described with reference to FIGS. 2A, 3A and 4A or to couple the extender 280 to the thermally insulating packagings 210, 220 described with reference to FIGS. 2C and 2D.

Manufacturing Process

Figure 6:
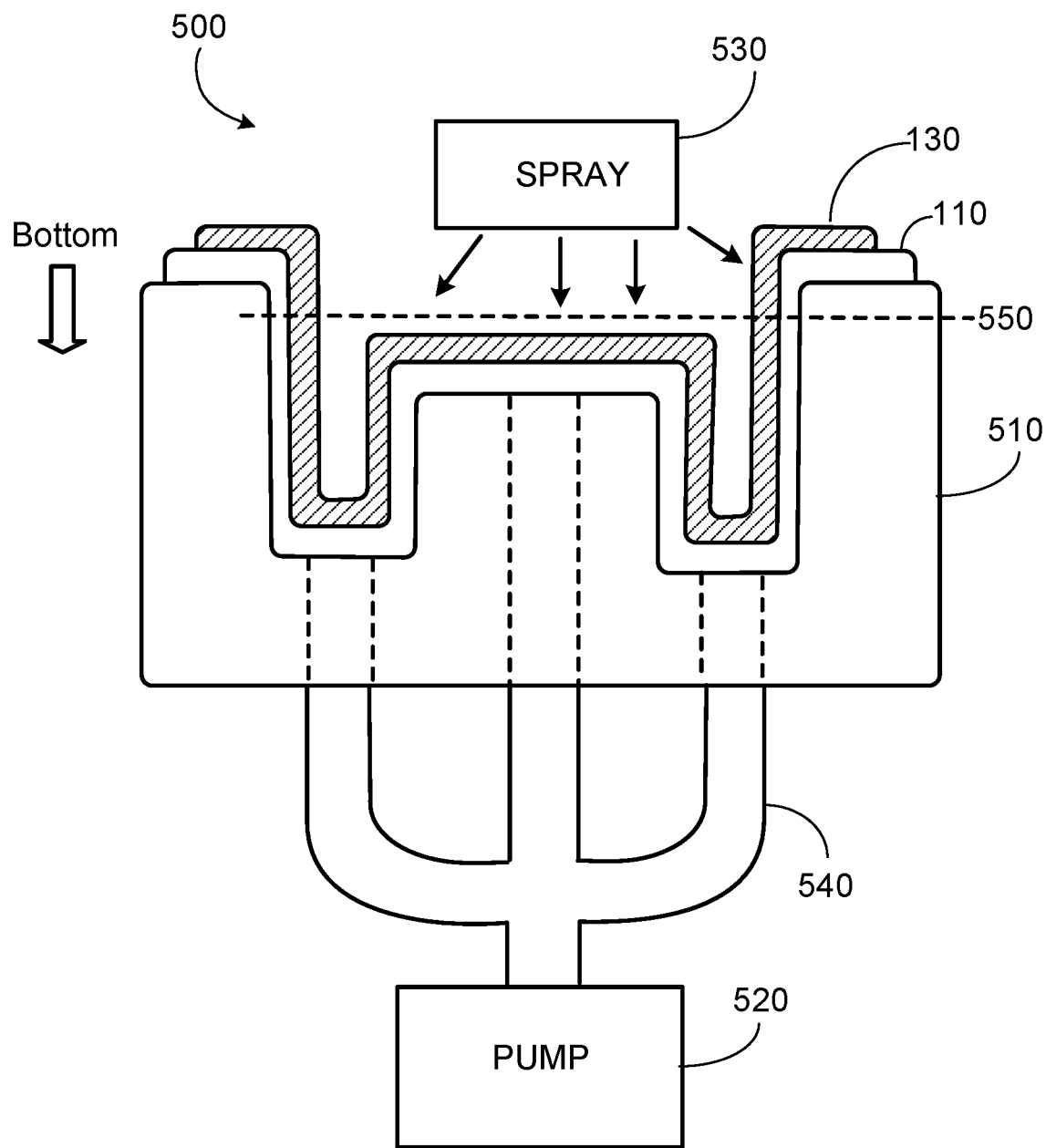
FIG. 6 is a diagram illustrating an example system to manufacture the thermally insulating packaging of FIG. 1A.

FIG. 6 is a diagram illustrating an example system to manufacture the thermally insulating packaging 100 of FIG. 1A.

As described above, the thermally insulating packaging 100 includes the solid compostable or recyclable body 110 and optionally the layer 130. The system 500 manufactures the thermally insulating packaging 100 using two processes, (i) a process to form the body 110 and (ii) a process to affix the layer 130 on a surface of the body 110. To form the body 110, any suitable techniques can be used. For example, a suction technique can be used. To affix the layer 130 on a surface of the body 110, any suitable techniques can be used. For example, an adhesive can be used.

The system 200 includes a mold 510, a pump 520, a spray 530, and one or more pipes 540. In this example suctioning process, compostable material that is provided to the mold 510 described above is provided to the reservoir 210. The compostable material can be highly viscous. Once the compostable material is provided on the surfaces of the mold 510, the pump 520 sucks the compostable material through the pipes 540 such that the compostable material evenly spreads over the surfaces of the mold 510. When the suction process is completed, the compostable material become hardened. Additional cooling or curing can be applied if needed to harden the compostable material. As a result, the body 110 is formed.

Optionally, the system 200 can affix the layer 130 on a surface of the unitary body 110. In this example, the layer 130 encloses the entire inner surfaces of the unitary body 110. In some implementations, different techniques can be used to partially enclose the unitary body 110 using the layer 130.

In some implementations, the layer can be secured to the body 110 by an adhesive. The adhesive can be a separate additive, or the adhesive can be provided by applying water to the body 110 to cause the starch in a portion of the body 110 at the surface to become tacky such that the layer 130 sticks to the body 110.

Where both the body 110 and layer 130 are compostable, the entire thermally insulating packaging 100 can be disposed of as a unit in a composting bin. Where the body 110 is compostable and the layer 130 is recyclable, the layer can be ripped off the body 110 manually by the recipient of the package, and then the body 110 can be disposed of in a composting bin and the layer can be disposed of a recycling bin.

Stackable Compostable or Recyclable Body

FIGS. 7A to 7C are cross-sectional views of implementations of a stackable body. In FIG. 7A, the outer side walls 160 can have a slope at a certain angle between 0 and 90 degrees. In FIG. 7B, the rims 165 of the outer side walls 160 are curved. In FIG. 7C, the outer side walls 160 have a slope and does not have rims between the outer side walls 160 and the inner side walls 170. These shapes of the body 110 enables multiple compostable bodies 110 to be stackable. As a result, large numbers of compostable bodies can be stacked so that they can be easily moved. In addition, the multiple compostable bodies can be stacked, they require less storage space.

Moisture Barrier Layer

The moisture barrier layer 130 can be water-proof, water-resistant or water-repellant layer 130 that encloses at least a portion of the compostable body 110. In some implementations, the layer 130 can fully enclose the compostable body 110. For example, the layer 130 can enclose across the entire surfaces of the compostable body 110. In some other implementations, the layer 130 can only partially enclose the compostable body 110. For example, the layer 130 can cover a particular surface, e.g., an interior surface or an exterior surface, of the compostable body 110 or a portion of a particular surface, e.g., a perimeter portion along the edge, a bottom portion, a central portion, or an upper portion of the interior surface, of the compostable body 110.

The layer 130 can be a biodegradable or compostable layer. The layer 130 prevents or inhibits water from penetrating the layer 130 not only from the interior area 35 to an exterior area of the compostable body 110, but also from the exterior area to the interior area 35. In some implementations, the layer 130 can be air-tight. In some implementations, the layer 130 can be a plastic film.

In some implementations, the layer 130 can be compostable, e.g., a bioplastic that meets ASTM D6400 standards. Example materials for a compostable layer include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). In addition, any combinations of these materials can be used for the layer 130. For example, a combination of PBAT and PE can be used for the layer 130. As another example, a combination of PE and PLA can be used for the layer 130. In some implementations, the polymer can be mixed with an organic product, e.g., starch or pulp, such as corn starch.

In some implementations, the layer 130 can be recyclable and biodegradable. A suitable material for the recyclable layer is polyethylene, e.g., a polyethylene film. For example, the layer can include LDPE, MDPE, HDPE, or polyethylene terephthalate. An advantage of polyethylene is ease of fabrication and good water resistance.

In some implementations, the layer is a paper sheet. If the paper is thin enough or is perforated, the paper is compostable. Optionally, the paper can be lined with a water-repellant coating. Either the inner surface of the layer, or the outer surface, or both can be lined with the water-repellant coating. The water-repellant coating can be a compostable material, e.g., wax. In this case, the layer with paper and coating is compostable. Alternatively, the water-repellant coating can be a recyclable material. In this case, the layer with paper and coating is recyclable.

In some implementations, the layer provides a film that encloses the compostable body, e.g., the body is slidable within a pocket formed by the film. In some implementations, the film is secured to the compostable body 110 by an adhesive.

In some implementations, the layer directly coats the compostable body. The layer that directly coats the compostable body can be composed of an organic compostable material, e.g., a wax. The layer can be spread in a thin layer on the surface of the body. The layer can be applied in liquid form and then harden on the compostable body. Alternatively, the layer can be sprayed onto the body. The sprayed-on layer can provide a moisture barrier. For example, a water-proof, water-resistant or water-repellant material can be sprayed onto the panel. In some implementations the layer can be polylactic acid (PLA).

A problem with starch-based insulation is that it dissolves easily in water. If the item being shipped is cold or a coolant is placed in the interior of the shipping container 10, condensation can form on the interior surfaces of the thermally insulating packaging 100. However, the layer 130 prevents liquid, e.g., the condensation, from reaching the starch of the compostable body 110, thus enabling the thermally insulating packaging 100 to be usable as a thermal insulator in the shipping container 10. However, in some implementations, the compostable body 110 is exposed to the environment, i.e., there is no layer coating or surrounding the compostable body 110.

Conclusion

It should be understood that, although various terms such as "top", "bottom", "vertical," and "lateral" are used, these terms indicate relative positioning of components under the assumption that an opening to the box 20 is at the top, and don't necessarily indicate an orientation relative to gravity; in use, or even during assembly, the container 10 could be on its side or upside down relative to gravity. The term "slightly" indicates no more than about 5%, e.g., no more than 2%.

A variety of combinations of the features discussed above are possible. The drawings show only a limited number of possible combinations, and it should be assumed that the various features described can be used together in any consistent combination. For example, the moisture barrier could coat the inside, or the inside and outside, of the single piece body (e.g., the body 110 shown in FIG. 1D). As another example, the recesses for air flow (e.g., as shown in FIG. 1F) could be combined with any of the other implementations. The 132 illustrated on the shell in any could be coat of FIG A number of embodiments have been described. Nevertheless, it will be understood that various modifications may be made without departing from the spirit and scope of the invention. Accordingly, other embodiments are within the scope of the following claims.

What is claimed is:

1. A cooler to hold an item, the cooler comprising:
a solid compostable or recyclable body that is formed primarily of a combination of starch and plant fiber, wherein the body includes:
a floor,
a plurality of side walls that are continuously and seamlessly coupled to the floor along first common edges and each continuously and seamlessly coupled to two adjacent side walls along second common edges,
wherein the floor and the plurality of side walls define an interior space of the body to receive the item and an opening to the interior space, wherein the side walls include a plurality of protrusions extending inwardly toward the interior space to provide increased structural support for the body while maintaining the interior space of the body as a single tub, and wherein the floor and side walls of the body are at least 0.02 inch thick and have a uniform thickness such that the protrusions on the inner side of the side walls define complementary recesses on the outer side of the side walls.

2. The cooler of claim 1, wherein at least 90% by weight of the body is the combination of starch and plant fiber.

3. The cooler of claim 2, wherein at least 95% by weight of the body is the combination of starch and plant fiber.

4. The cooler of claim 3, wherein body consists of the combination of starch and plant fiber.

5. The cooler of claim 2, wherein the body includes a moisture barrier material mixed with the combination of starch and plant fiber.

6. The cooler of claim 5, wherein body consists of the combination of starch, plant fiber and moisture barrier material.

7. The cooler of claim 6, wherein body consists of the combination of starch, plant fiber and polylactic acid.

8. The cooler of claim 2, wherein the body includes polylactic acid mixed with the with the combination of starch and plant fiber.

9. The cooler of claim 1, wherein the plant fiber is a paper pulp.

10. The cooler of claim 1, wherein the starch is a grain starch.

11. The cooler of claim 1, comprising a moisture barrier layer disposed on the shell and configured to block water penetrating the shell.

12. The cooler of claim 1, wherein a thickness of the body is $1/32$ to 1 inch.

13. The cooler of claim 1, wherein a thickness of the body is 0.02 to 0.3 inches.

14. The cooler of claim 1, wherein the recess is shaped to provide a hand grip for the cooler.

15. The cooler of claim 14, wherein the recess is positioned adjacent a horizontal edge of the side wall.

16. The cooler of claim 1, wherein each side wall of two opposite side walls of the plurality of side walls form a protrusion that extends inwardly into the interior space.

17. The cooler of claim 1, wherein each protrusion runs vertically from near an upper edge of the side wall to the floor of the side wall.

18. The cooler of claim 1, wherein the plurality of protrusions run vertically on the side walls.

19. The cooler of claim 18, wherein the plurality of protrusions form rectilinear stripes.

20. The cooler of claim 1, wherein the body is compostable.

21. The cooler of claim 1, wherein the body is recyclable.

22. The cooler of claim 1, wherein the starch is a milled or extruded starch.

* * * * *